US007995102B2

(12) United States Patent  (10) Patent No.: US 7,995,102 B2
Makino  (45) Date of Patent: Aug. 9, 2011

(54) IMAGING APPARATUS FOR GENERATING STROBOSCOPIC IMAGE

(75) Inventor: Tetsuji Makino, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 354 days.

(21) Appl. No.: 12/369,237

(22) Filed: Feb. 11, 2009

(65) Prior Publication Data

US 2009/0201382 A1    Aug. 13, 2009

(30) Foreign Application Priority Data

Feb. 13, 2008  (JP) .............. P2008-031866

(51) Int. Cl.
 *H04N 5/225* (2006.01)
 *H04N 5/262* (2006.01)
(52) U.S. Cl. .................... 348/218.1; 348/239
(58) Field of Classification Search ............. None
 See application file for complete search history.

(56) References Cited

U.S. PATENT DOCUMENTS 5,721,692 A    2/1998  Nagaya et al.

FOREIGN PATENT DOCUMENTS

| JP | 62-147891 A | 7/1987 |
|---|---|---|
| JP | 02-236787 A | 9/1990 |
| JP | 06-098325 A | 4/1994 |
| JP | 09-073541 A | 3/1997 |
| JP | 09-102910 A | 4/1997 |
| JP | 3569992 B2 | 7/2004 |
| JP | 3793258 B2 | 4/2006 |

OTHER PUBLICATIONS

Japanese Office Action dated Jan. 12, 2010 and English translation thereof issued in a counterpart Japanese Application No. 2008-031866.

*Primary Examiner* — Lin Ye
*Assistant Examiner* — Euel K Cowan
(74) *Attorney, Agent, or Firm* — Holtz, Holtz, Goodman & Chick PC

(57) ABSTRACT

An imaging apparatus includes: an imaging section configured to output a first set of digital images; a section generating a plurality of sets of one-dimensional data from each of digital images respectively based on an object movement direction representing a movement direction of a moving object; a section configured to detect object regions for each of the digital images respectively based on the respective sets of the one-dimensional data; a section configured to select a second set of digital images from among the first set based on the object regions; a section configured to generate a background image from the second set of digital images; and a section configured to generate a stroboscopic image by combining the background image and a plurality of object images corresponding to the object regions of the second set of digital images.

9 Claims, 17 Drawing Sheets

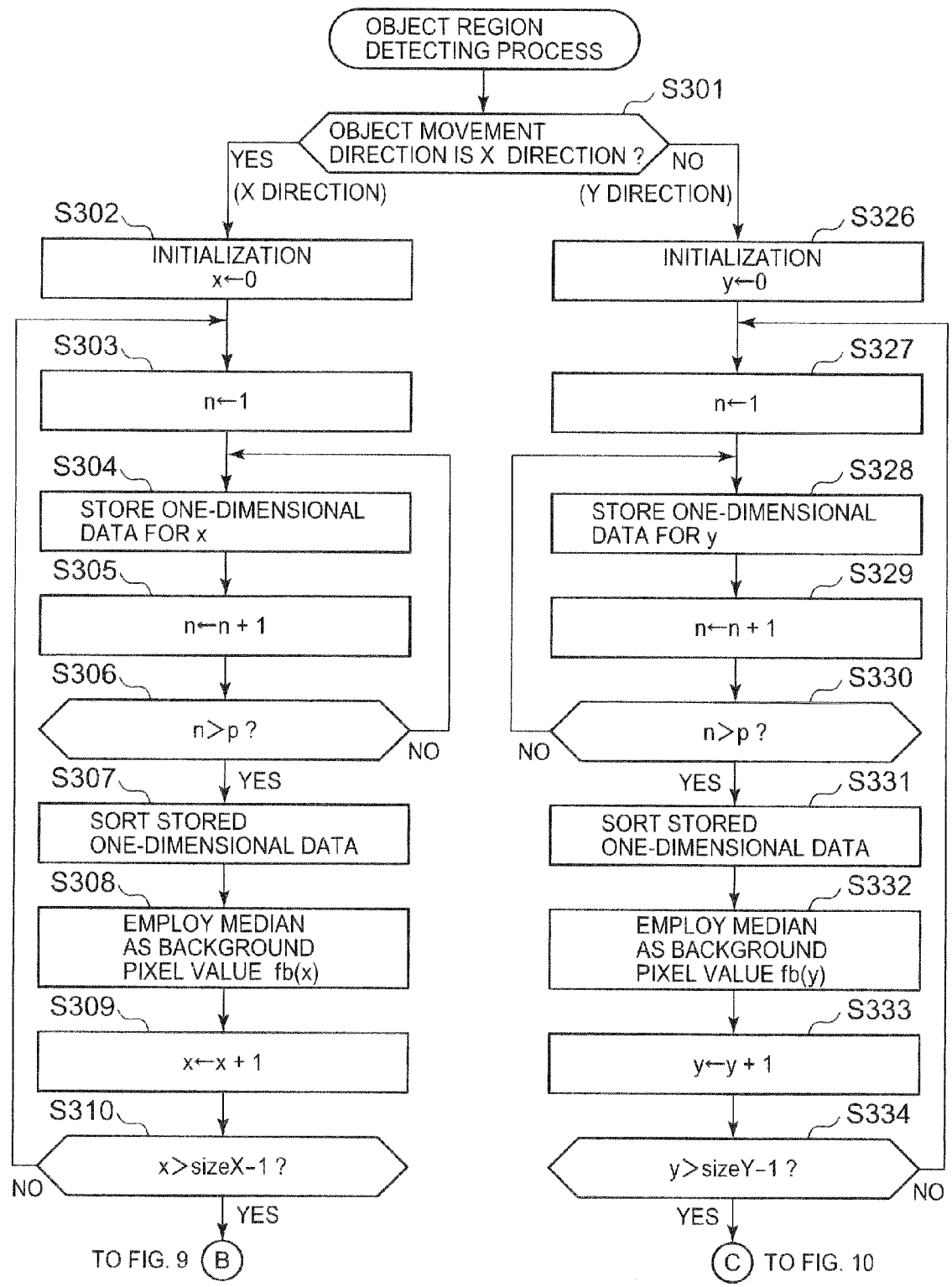

STROBOSCOPIC IMAGE

IMAGING APPARATUS FOR GENERATING STROBOSCOPIC IMAGE

CROSS-REFERENCE TO THE RELATED APPLICATION(S)

The present application is based upon and claims priority from prior Japanese Patent Application No. 2008-031866, filed on Feb. 13, 2008, the entire content of which are incorporated herein by reference.

TECHNICAL FIELD

The present invention relates to an imaging apparatus, a method for generating stroboscopic image, and a computer-readable storage medium containing a program for generating stroboscopic image.

BACKGROUND

A stroboscopic image (multi-stroboscopic image) is known which is produced by capturing a multiple image of a moving object with a stationary camera and shows, as a single image (photograph) a manner of movement of the object. In the days of film cameras, such a stroboscopic image was taken by performing plural strobe light emissions on a moving object during a long-term exposure. However, since digital cameras have become widely used, such a stroboscopic image can be generated by computer image processing performed by the digital camera.

As a conventional method for generating stroboscopic image by image processing, there is proposed a method to determine object positions by extracting object portions from images, the object portions not overlapping with one another. An example of such method is disclosed in Japanese Patent No. 3,793,258. There is also being proposed a method to determine object positions, the method in which a time point, which appears to be used a background image for generating the stroboscopic image, is specified from a video image. An example of such method is disclosed in Japanese Patent No. 3,569,992 (counterpart U.S. publication is: U.S. Pat. No. 5,721,692).

In the conventional methods described above, object positions in images cannot be determined until area information is acquired for all the captured images in a case where the frame rate or the object size varies during the consecutive image capturing or video image capturing. As a result, in generating a stroboscopic image from images consecutively captured or from a video image, a considerable time is required to select images to be used for generating a stroboscopic image. Accordingly, a stroboscopic image cannot be generated at high speed when the conventional methods are used.

SUMMARY

According to a first aspect of the invention, there is provided an imaging apparatus including: an imaging section configured to consecutively capture a plurality of images of a scene including a moving object and output a first set of digital images; a one-dimensional data generating section configured to generate a plurality of sets of one-dimensional data from each of digital images included in the first set respectively based on an object movement direction representing a movement direction of the moving object; an object detecting section configured to detect object regions for each of the digital images of the first set respectively based on the respective sets of the one-dimensional data, the object regions representing regions where the moving object exists in the respective digital images; an image selecting section configured to select a second set of digital images from among the first set based on the object regions detected by the object detecting section; a background image generating section configured to generate a background image from the second set of digital images; and a stroboscopic image generating section configured to generate a stroboscopic image by combining the background image and a plurality of object images corresponding to the object regions of the second set of digital images.

According to a second aspect of the invention, there is provided a method for generating a stroboscopic image, the method including: generating a plurality of sets of one-dimensional data from each of a first set of digital images respectively based on an object movement direction representing a movement direction of a moving object captured by the first set of digital images; detecting object regions for each of the digital images of the first set respectively based on the respective sets of the one-dimensional data, the object regions representing regions where the moving object exists in the respective digital images; selecting select a second set of digital images from among the first set based on the object regions; generating background image from the second set of digital images; and generating a stroboscopic image by combining the background image and a plurality of object images corresponding to the object regions of the second set of digital images.

According to a third aspect of the invention, there is provided a computer-readable storage medium containing a sequence of instructions for a program executable by a computer system, the program including: instructions for generating a plurality of sets of one-dimensional data from each of a first set of digital images respectively based on an object movement direction representing a movement direction of a moving object captured by the first set of digital images; instructions for detecting object regions for each of the digital images of the first set respectively based on the respective sets of the one-dimensional data, the object regions representing regions where the moving object exists in the respective digital images; instructions for selecting select a second set of digital images from among the first set based on the object regions; instructions for generating a background image from the second set of digital images; and instructions for generating a stroboscopic image by combining the background image and a plurality of object images corresponding to the object regions of the second set of digital images.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIGS. 4A and 4B show display examples of setting screens that are displayed during the stroboscopic image generating process shown in FIG. 3, wherein FIG. 4A shows a display example of a setting screen through which to specify a camera orientation, and wherein FIG. 4B shows a display example of a setting screen through which to specify an object movement direction.

FIGS. 5A and 5B illustrate images taken according to the embodiment of the invention, wherein FIG. 5A illustrates a scene of consecutive image capturing for generating a stroboscopic image, and wherein FIG. 5B illustrates example images (consecutively captured images) taken by the consecutive image capturing shown in FIG. 5A.

FIGS. 7A and 7B illustrate one-dimensional data generating process and an object region detecting process, wherein FIG. 7A shows a relationship between a coordinate system of a captured image and an object movement direction, wherein sections (a) and (b) in FIG. 7B show example one-dimensional data as projections of captured images, and wherein section (c) in FIG. 7B shows the one-dimensional data of those shown in sections (a) and (b) in FIG. 7B being overlapped.

FIG. 8 is a flowchart of the object region detecting process which is performed in the stroboscopic image generating process shown in FIG. 3.

FIGS. 11A and 11B illustrate the object region detecting process shown in FIGS. 8-10, wherein FIG. 11A shows example object regions that are detected in the case where the object movement direction is the X direction, and wherein FIG. 11B shows example object regions that are detected in the case where the object movement direction is the Y direction.

DETAILED DESCRIPTION

Figure 1:
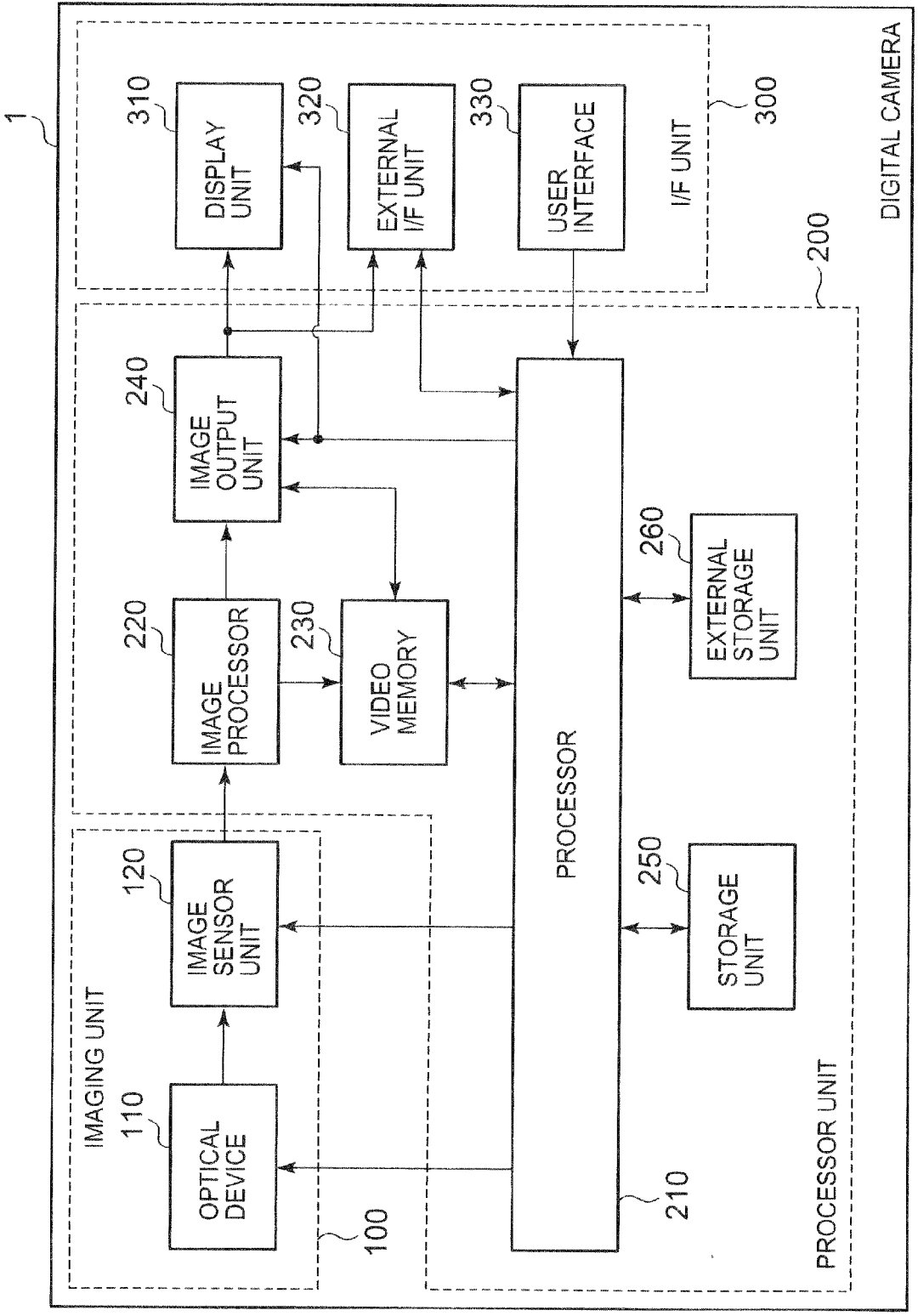
FIG. 1 is a block diagram showing a configuration of a digital camera according to an embodiment of the present invention.

An embodiment according to the present invention will be described in detail with reference to the accompanying drawings. The scope of the claimed invention should not be limited to the examples illustrated in the drawings and those described in below.

The embodiment described herein is directed to a case that the present invention is implemented in the form of a digital still camera (hereinafter referred to as a digital camera). It is assumed that the digital camera 1 according to the embodiment is provided with functions of general digital still cameras which include the consecutive image capturing function. The consecutive image capturing function is a function for capturing a plurality of consecutive images by a single shutter button operation.

The digital camera 1 according to the embodiment is provided with a stroboscopic image generating function for generating a stroboscopic image (multi-stroboscopic image) from captured images acquired by the consecutive image capturing function. The term "stroboscopic image" is used in a meaning representing a single image which includes multiple images of a moving object showing a movement of the moving object. To generate a stroboscopic image with the digital camera 1, images of a moving object are captured using the consecutive image capturing function. During this image capturing, the digital camera 1 is fixed and unmoved.

FIG. 1 is a block diagram showing the configuration of the digital camera 1 according to the embodiment of the invention. As shown in FIG. 1, the digital camera 1 according to the embodiment is provided with an imaging unit 100, a processor unit 200, and an interface (I/F) unit 300.

As shown in FIG. 1, the imaging unit 100, which is a unit for performing an imaging operation of the digital camera 1, includes an optical device 110 and an image sensor unit 120.

The optical device 110 includes a lens, an aperture mechanism, and a shutter mechanism, for example, and performs optical operations for capturing (taking) an image. That is, incident light is focused and optical features such as the focal length, aperture, and shutter speed which relate to the angle of view, focus, exposure, etc. are adjusted through operation of the optical device 110. The shutter mechanism of the optical device 110 is a mechanical shutter. Where a shutter operation is performed only by an operation of an image sensor, the optical device 110 need not include the shutter mechanism. The optical device 110 operates under the control of a processor 210 (described later).

The image sensor unit 120 is an image sensor such as a CCD (charge-coupled device) or a CMOS (complementally metal oxide semiconductor) sensor which generates an electrical signal corresponding to incident light as focused by the optical device 110. The image sensor unit 120 generates an electrical signal through photoelectric conversion and outputs the electrical signal to the processor unit 200.

The processor unit 200 generates digital data representing a captured image by processing an electrical signal generated by the imaging unit 100 by an image capturing operation and performs image processing on the captured image. As shown in FIG. 1, the processor unit 200 includes the processor 210, an image processor 220, a video memory 230 an image output unit 240, a storage unit 250 and an external storage unit 260.

The processor 210, which, for example, includes a processor such as CPU (central procession unit), a main memory such as a RAM (random access memory), etc., controls other components and units of the digital camera 1 by running software programs stored in the storage unit 250 (described later), for example. In the embodiment, functions relating to individual pieces of processing (described later) are provided by the processor 210 running the software programs.

The image processor 220, which, for example, includes an ADC (analog-digital converter), a buffer memory, and an image processing unit (what is called an image processing engine), generates digital data representing a captured image based on an electrical signal generated by the imaging unit 100.

When the ADC has converted analog electrical signals that are output from the image sensor unit 120 into digital signals and stored the latter in the buffer memory sequentially, the image processing engine performs image quality adjustment and data compression by performing processes including development processing on the buffered digital data.

The video memory 230, which is a storage device such as a RAM or a flash memory, temporarily stores data including captured image data generated by the image processor 220 and image data as processed by the processor 210.

The image output unit 140, which is an RGB signal generation circuit, for example, converts image data that is extracted in the video memory 230 into RGB signals or the like and outputs to a display device (e.g., display unit 310 (described later)).

The storage unit 250, which is a storage device such as a ROM (read-only memory) or a flash memory, stores programs and data that are used for operation of the digital camera 1. In the embodiment, it is assumed that operation programs to be run by the processor 210 and parameters and calculation formulae that are necessary for processing are stored in the storage unit 250.

The external storage unit 260, which is a storage device such as a memory card that can be attached to and detached from the digital camera 1, stores data including image data taken by the digital camera 1.

As shown in FIG. 1, the interface unit 300, which serves as an interface between the digital camera 1 and a user or an external apparatus, includes the display unit 310, an external interface (I/F) unit 320 and a user interface 330.

The display unit 310, which is, for example, a liquid crystal display device displays images including various screens that are used for operating the digital camera 1, a live view image at the time of shooting and a captured image. In the embodiment, the display unit 310 displays the images including captured image based on, for example, an image signal (RGB signals) from the image output unit 140.

The external interface unit 320, which is a USB (universal serial bus) connector, a video output terminal, or the like, serves for output of image data to an external computer, display of a captured image on an external monitor, and other operations.

The user interface 330, which includes various buttons and switches provided on the outer surface of the digital camera 1, generates an input signal corresponding to an operation of a user of the digital camera 1 and inputs to the processor 210. It is assumed that the buttons provided in the user interface 330 include a shutter button for commanding a shutter operation, a mode button for specifying an operation mode of the digital camera 1, and a four-direction key and function buttons for allowing the user to input various settings.

In the embodiment, various kinds of processing (described later) are performed as the processor 210 runs operation programs stored in the storage section 250. Functions which are provided in this manner by the processor 210 will be described below with reference to FIG. 2.

Figure 2:
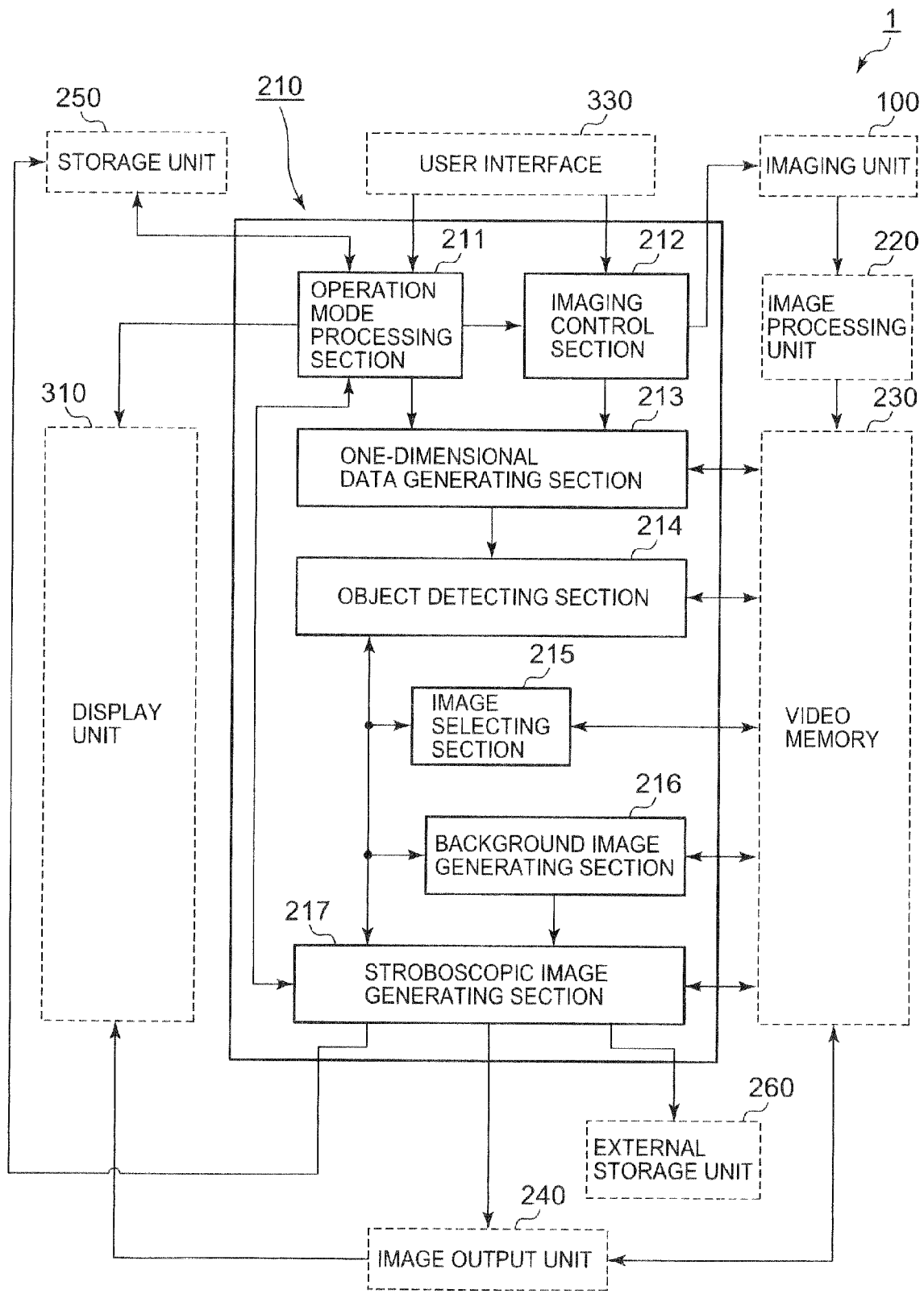
FIG. 2 is a functional block diagram showing functions which are provided by a controller shown in FIG. 1.

FIG. 2 is a functional block diagram showing functions which are provided by the processor 210. FIG. 2 shows a functional configuration which is used for realizing a function of generating a stroboscopic image from images taken by the consecutive image capturing function. In the embodiment, as shown in FIG. 2, the processor 210 operates to serve as an operation mode processing section 211, an image-capture controlling section 212, a one-dimensional data generating section 213, an object detecting section 214, an image selecting section 215, a background image generating section 216, and a stroboscopic image generating section 217.

The operation mode processing section 211 cooperates with the display unit 310 to display a screen that is used for allowing a user of the digital camera 1 to designate one of various operation modes of the digital camera 1, a setting screen for each selected operation mode, and other pictures. Furthermore, the operation mode processing section 211 cooperates with the user interface 330 to recognize an operation mode selected by a user, reads programs, calculation formulae, etc. that are necessary for operation in the selected operation mode from the storage unit 250, and loads them to the main memory of the processor 210.

In the embodiment, it is assumed that an operation mode (stroboscopic image generation mode) corresponding to the stroboscopic image generating function is selected by a user. Functional blocks to be described below of the processor 210 are provided through execution of programs that are loaded by the operation mode processing section 211 in response to selection of the stroboscopic image generation mode.

The image-capture controlling section 212 performs an imaging operation of the digital camera 1 by controlling the imaging unit 100. The stroboscopic image generating function relating to the embodiment is a function of generating a stroboscopic image from captured images taken by the consecutive image capturing function of the digital camera 1. Therefore, the image-capture controlling section 212 according to the embodiment controls the imaging unit 100 to cause it to perform a consecutive image capturing operation. It is assumed that the imaging unit 100 performs an imaging operation continuously while the shutter button of the user interface 330 is pressed. Images (consecutively captured images) taken by the consecutive image capturing (consecutive shooting) operation under the control of the image-capture controlling section 212 are sequentially stored in the video memory 230 after being processed by the image processor 220. For example, the consecutively captured images to be stored in the video memory 230 are assigned with respective frame numbers in order of capturing (shooting).

The one-dimensional data generating section 213 sequentially converts the consecutively captured images stored in the video memory 230 into one-dimensional data and stores them in the main memory of the processor 210. The term "one-dimensional data" is used in a meaning representing data having a value obtained by projecting information such as pixel values constituting image data on a given coordinate axis. For example, the value is calculated by summing the pixel values of RGBs or YUVs in a direction orthogonal to the given coordinate axis. In the embodiment, projection data obtained by projecting image data in a given direction is employed as one-dimensional data. The direction in which image data is projected is determined based on a moving direction of a target object (described later in detail).

The object detecting section 214 detects a region corresponding to an object in each captured image by comparing one-dimensional data of the captured images. The object detecting section 214 detects position information (coordinate information) of the detected object region. Furthermore, the object detecting section 214 extracts object portions of images selected by the image selecting section 215 from the images (consecutively captured images) stored in the video memory 230.

The image selecting section 215 selects images (frames) suitable for generating a stroboscopic image by selecting captured images whose object portions do not overlap with each other based on the position information of the object regions detected by the object detecting section 214.

The background image generating section 216 generates a background image from the captured images selected by the image selecting section 215. More specifically, the background image generating section 216 generates a background image not having an object portion by acquiring pixel values at the same coordinates for all the selected captured images and employs a median, for example, of the pixel values as a pixel value of the coordinates.

The stroboscopic image generating section 217 generates a stroboscopic image in which a moving object are located at plural positions in the single background image with no overlap by combining the background image generated by the background image generating section 216 with images of the object portions extracted by the object detecting section 214 from the respective selected captured images.

In the description herein, it is assumed that the sections described above are implemented in the processor 210 as a software configuration, and the functions obtained by the sections are provided by logical processing performed by the processor 210 running a software program. However, the sections may be provided in the processor 210 as a hardware configurations as such by an application-specific integrated circuit (ASIC).

At least a part of the sections may alternatively be implemented in or provided by the image processor 220. In the embodiment, the processor 210 and the image processor 220 are described to be configured by separate components, however, the processor 210 and the image processor 220 may alternatively be configured as a single component as such by a single semiconductor chip. The components provided in the processor unit 200, including the processor 210 and the image processor 220, may also be configured as a separate component or may be configured as a single component as well.

The digital camera 1 may be provided with functions and components other than those described herein.

The operation of the above-configured digital camera 1 will be described below. A stroboscopic image generating process which is performed by the digital camera 1 when the stroboscopic image generation mode is selected will be described below with reference to a flowchart of FIG. 3. The stroboscopic image generating process is started as soon as the stroboscopic image generation mode is selected by a user of the digital camera 1 by operating the user interface 330. The following process is performed by the functional blocks shown in FIG. 2 after the operation mode processing section 211 loads the programs and data relating to the stroboscopic image generation mode from the storage unit 250.

Figure 4A:
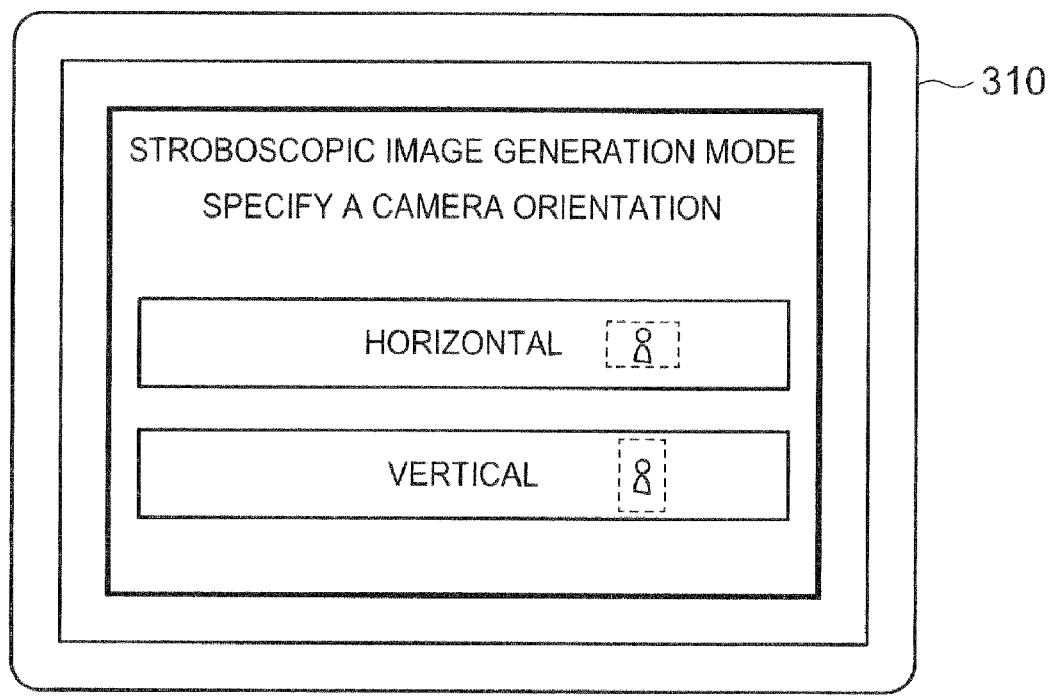
Figure 4B:
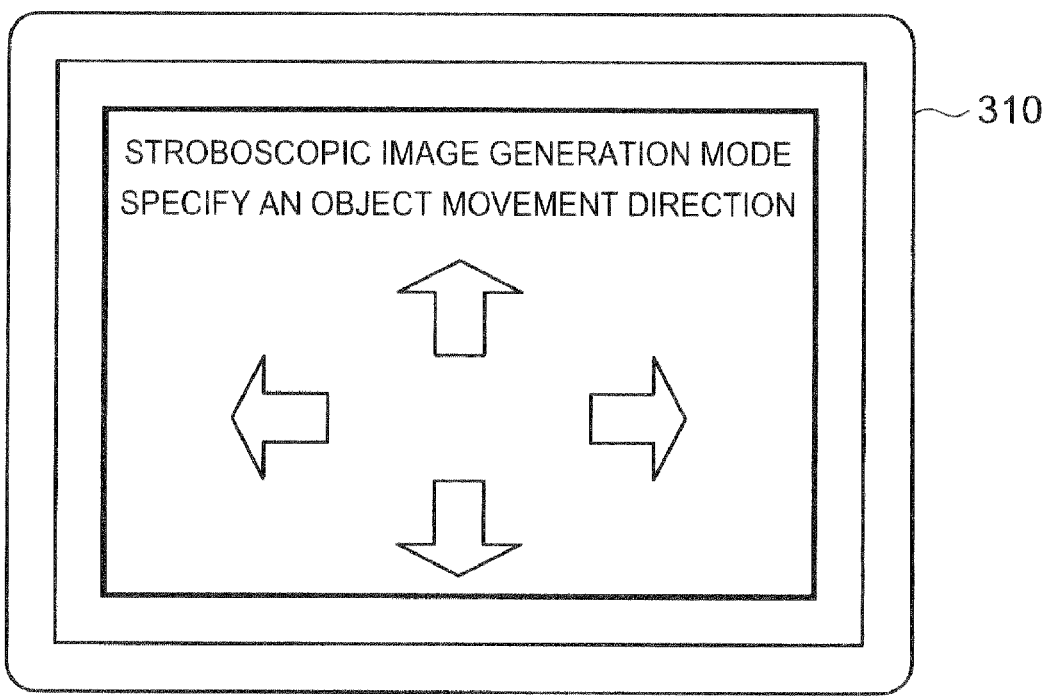

Upon starting the process, at step S101, the operation mode processing section 211 displays, on the display unit 310, setting screens for setting configurations that are used in the stroboscopic image generation mode. FIGS. 4A and 4B show example setting screens to be displayed.

First, a setting screen as shown in FIG. 4A for setting of a camera orientation (horizontal or vertical) is displayed. This setting screen is to prompt the user to choose an orientation (horizontal or vertical) of the digital camera 1 to be employed in taking consecutively captured images for a stroboscopic image. The user of the digital camera 1 specifies a camera orientation to be employed at the time of consecutive image capturing by operating the user interface 330. Where the digital camera 1 has a vertical orientation detecting function or the like using an acceleration sensor or the like, it is not necessary to prompt the user to specify a camera orientation through a setting screen because a detection result of that function can be used.

Upon specification of a camera orientation, the operation mode processing section 211 displays, on the display unit 310, a setting screen as shown in FIG. 4B for setting of an object movement direction. An object movement direction is set here because a moving object is to be shot in the stroboscopic image generation mode. As shown in FIG. 4B, arrows indicating four directions, for example, are displayed in the setting screen for setting of an object movement direction. The user sets a movement direction of an object to be shot by operating the four-direction key, for example, of the user interface 330.

At step S102, the operation mode processing section 211 stores the thus-set camera orientation and object movement direction in, for example, the main memory of the processor 210 and thereby finalizes the settings relating to the stroboscopic image generation mode.

Relationships between the digital camera 1 and an object at the time of shooting in the stroboscopic image generation mode will be described below with reference to FIG. 5A. Assume a case of capturing an image of an object MV moving left to right with the digital camera 1. In this case, image capturing (shooting) is performed in a state that the orientation and the angle of view of the digital camera 1 are fixed. In the case of the image capturing illustrated in FIG. 5A, settings "camera orientation: horizontal" and "object movement direction: rightward" are set at step S102. That is, horizontal movement of an object is set.

Since consecutive image capturing should be performed in the stroboscopic image generation mode, the user of the digital camera 1 will start shooting by operating the shutter button of the user interface 330 after making the above settings. Therefore, when the stroboscopic image generation mode has been selected, the operation mode processing section 211 instructs the image-capture controlling section 212 to perform consecutive image capturing.

When the user (photographer) of the digital camera 1 manipulates (presses) the shutter button (user interface 330), an input signal corresponding to the operation is input from the user interface 330 to the processor 210. As a result, the image-capture controlling section 212 determines that the shutter button has been manipulated (S103: yes) and performs consecutive image capturing by controlling the imaging unit 100 at step S104. The consecutive image capturing operation is continued while the user presses the shutter button (S105: no).

When the shutter operation is finished (S105: yes), the image-capture controlling section 212 instructs the imaging unit 100 to finish the image capturing operation. As a result, the consecutive image capturing operation is finished and images (consecutively captured images) taken by the consecutive image capturing operation are sequentially stored in the video memory 230 after being processed by the image processor 220 (step S106).

Figure 5A:
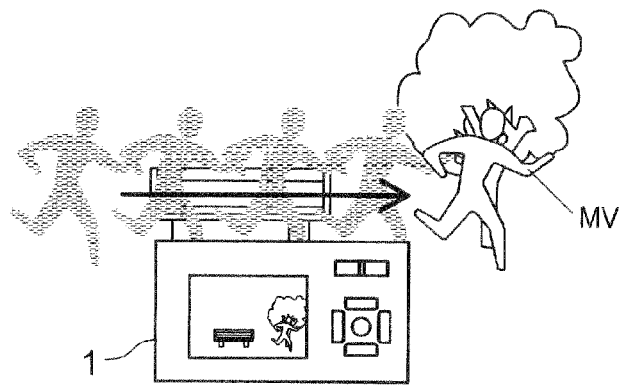
Figure 5B:
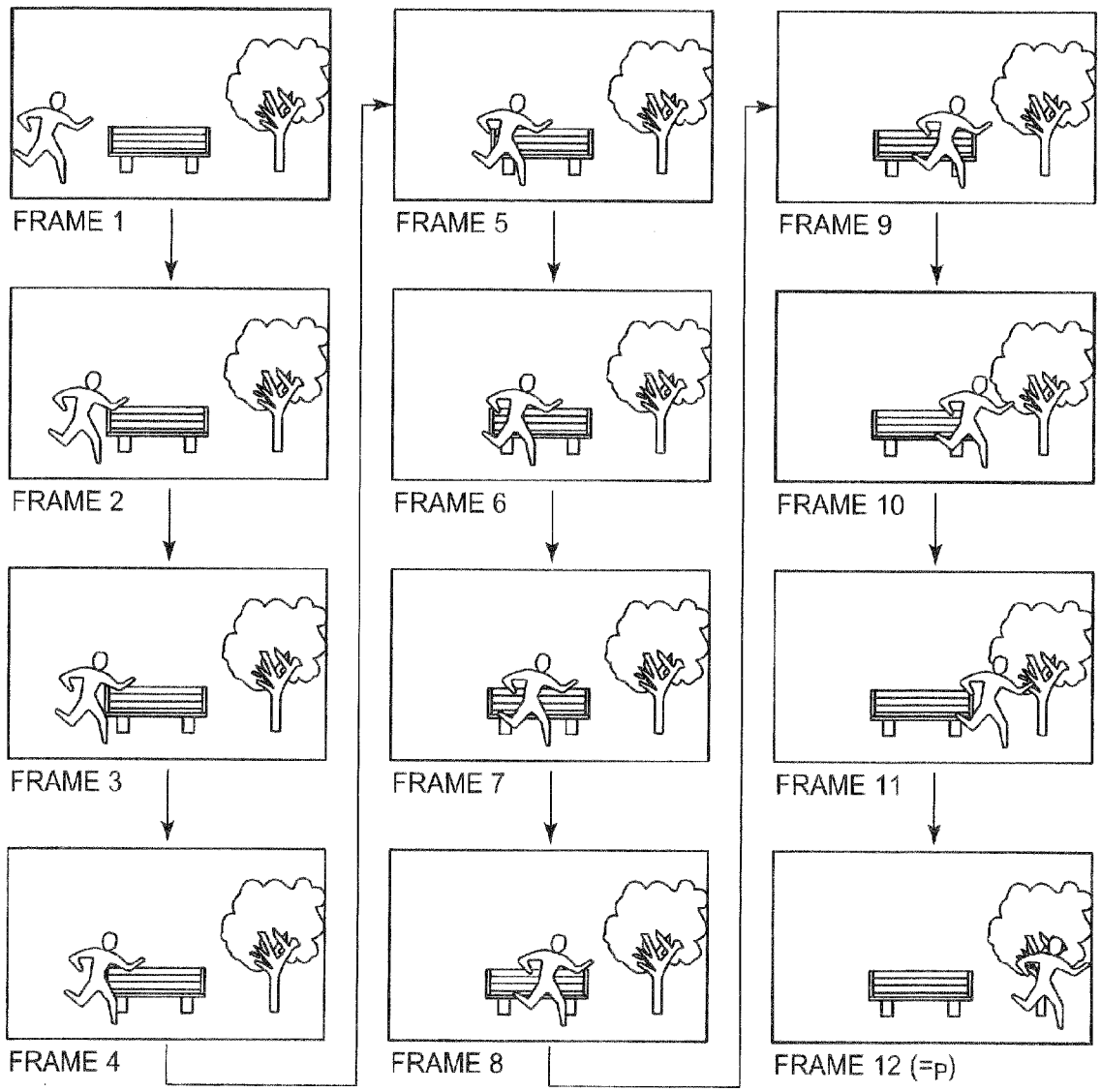

FIG. 5B shows example consecutively captured images obtained by consecutively capturing an image of a scene shown in FIG. 5A. As shown in FIG. 5B, a plurality of captured images indicate how the object MV moved. Since as mentioned above the image capturing was performed with the digital camera 1 being unmoved, the portions (i.e., backgrounds), other than the portion where the object MV exists, of the respective captured images have no large variations.

The consecutively captured images taken by the single consecutive image capturing operation are assigned frame numbers 1 to p in time-series order of the image capturing. In the example shown in FIG. 5B, frame 1 to frame 12 (p=12) are obtained.

Figure 6:
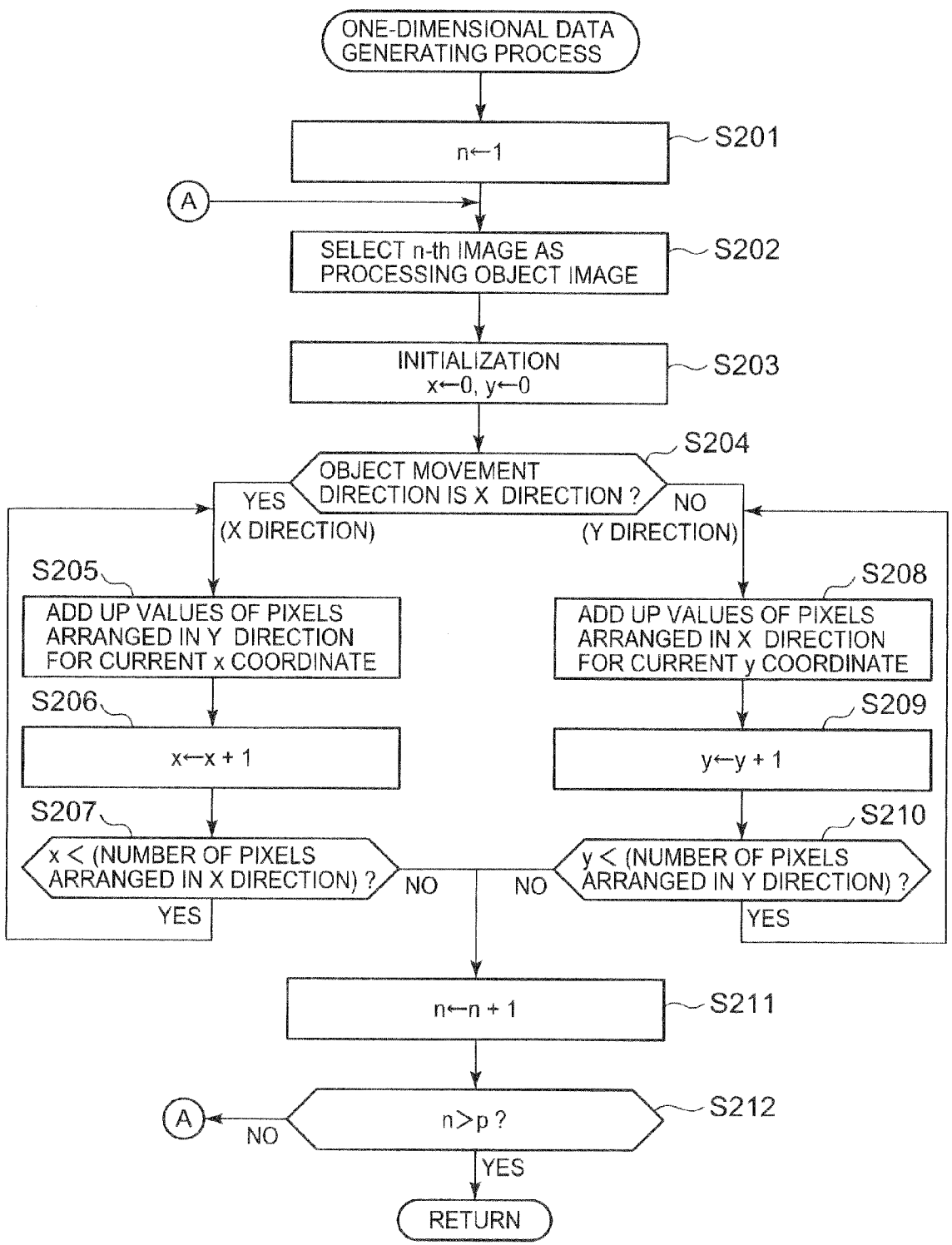
FIG. 6 is a flowchart of a one-dimensional data generating process which is performed in the stroboscopic image generating process shown in FIG. 3.

After performing the above consecutive image capturing, processes for generating a stroboscopic image using the thus-obtained consecutively captured images are performed sequentially. First, as soon as the image-capture controlling section 212 notifies the one-dimensional data generating section 213 of the completion of the consecutive image capturing, a one-dimensional data generating process for converting the consecutively captured images into one-dimensional data is performed at step S200. The one-dimensional data generating process will be described below with reference to a flowchart of FIG. 6. In the following description, it is assumed in the following description that a camera orientation "horizontal" is set.

Upon starting the process, at step S201, the one-dimensional data generating section 213 sets a frame number initial value "1" in a pointer n which indicates a processing object image (frame). At step S202, the one-dimensional data generating section 213 selects, as a processing object image, an image that is stored in the video memory 230 and has the consecutive image capturing frame number n (i.e., an n-th image).

Figure 7A:
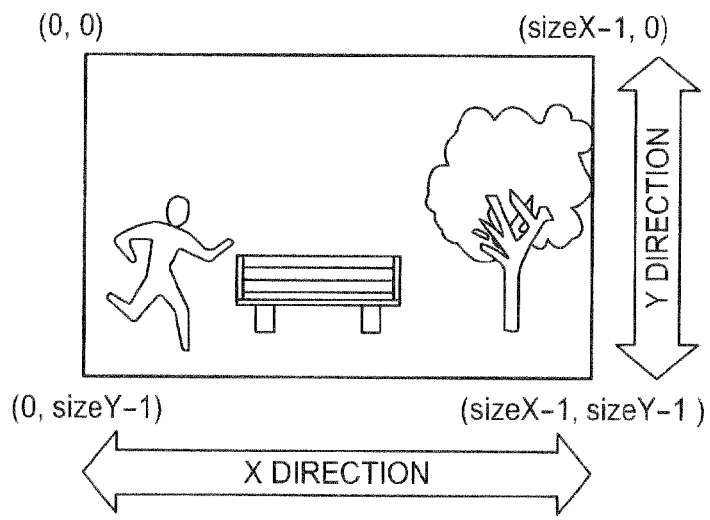

After selecting the processing object image, at step S203 the one-dimensional data generating section 213 initializes search coordinates of the image concerned. It is assumed here that each of the x and y initial search coordinates is "0." The coordinates of an image will be described below with reference to FIG. 7A. In the embodiment, since the camera orientation "horizontal" is set, an image taken by the digital camera 1 is longer in the horizontal direction as shown in FIG. 7A. In this case, the right-left direction and the top-bottom direction of the image are employed as the X direction and the Y direction, respectively. The top-left corner of the image is employed as the origin (0, 0) of the coordinate system. If the number of pixels in the X direction is represented by sizeX, the maximum value of the x coordinate is sizeX−1. Likewise, if the number of pixels in the Y direction is represented by sizeY, the maximum value of the y coordinate is sizeY−1.

At step S204, the one-dimensional data generating section 213 determines whether the object movement direction that was set at step S102 of the stroboscopic image generating process (FIG. 3) coincides with the X direction or the Y direction of the coordinate system, defined as shown in FIG. 7A, of the captured image. Where the camera orientation is "horizontal," the object movement direction should be the X direction (horizontal direction) if "rightward" or "leftward" was specified through the setting screen of FIG. 4(b). On the other hand, if "upward" or "downward" was specified, the object movement direction should be the Y direction (vertical direction).

In the scene illustrated in FIG. 5A, since the object MV which was moving in the horizontal direction was shot, the object movement direction should be determined the X direction (S204: yes). Where the object movement direction is the X direction, the one-dimensional data generating section 213 performs processing of projecting the image in the direction orthogonal to the object movement direction, that is, in the Y direction.

In this case, the one-dimensional data generating section 213 performs projection in the Y direction by adding up values of the pixels arranged in the Y direction for every x coordinate of the processing object image (steps S205-S207; S207: yes). Since the search coordinates were initialized at step S203, first, at step S205, values of the pixels arranged in the Y direction for the current x coordinate are added up and a result is stored in the main memory of the processor 210. At step S206, the x coordinate is incremented by one and the same calculation is performed for the incremented x coordinate. This processing is performed repeatedly for the size of the image in the X direction that is, the number of pixels in the X direction.

On the other hand, if the object movement direction is the Y direction (top-bottom direction) (S204: no), the image is projected in the direction orthogonal to the movement direction, that is, in the X direction, by the same method as described above (steps S208-S210; S210: yes).

Upon completion of the projection of the processing object image (S207: no or S210: no), at step S211 the one-dimensional data generating section 213 increments the pointer n by one. If the frame number corresponding to the pointer n is smaller than or equal to the number p of frames that were assigned the frame numbers at the time of the consecutive image capturing (S212: no), at step S202 the next consecutively captured image is selected as a processing object image.

Figure 3:
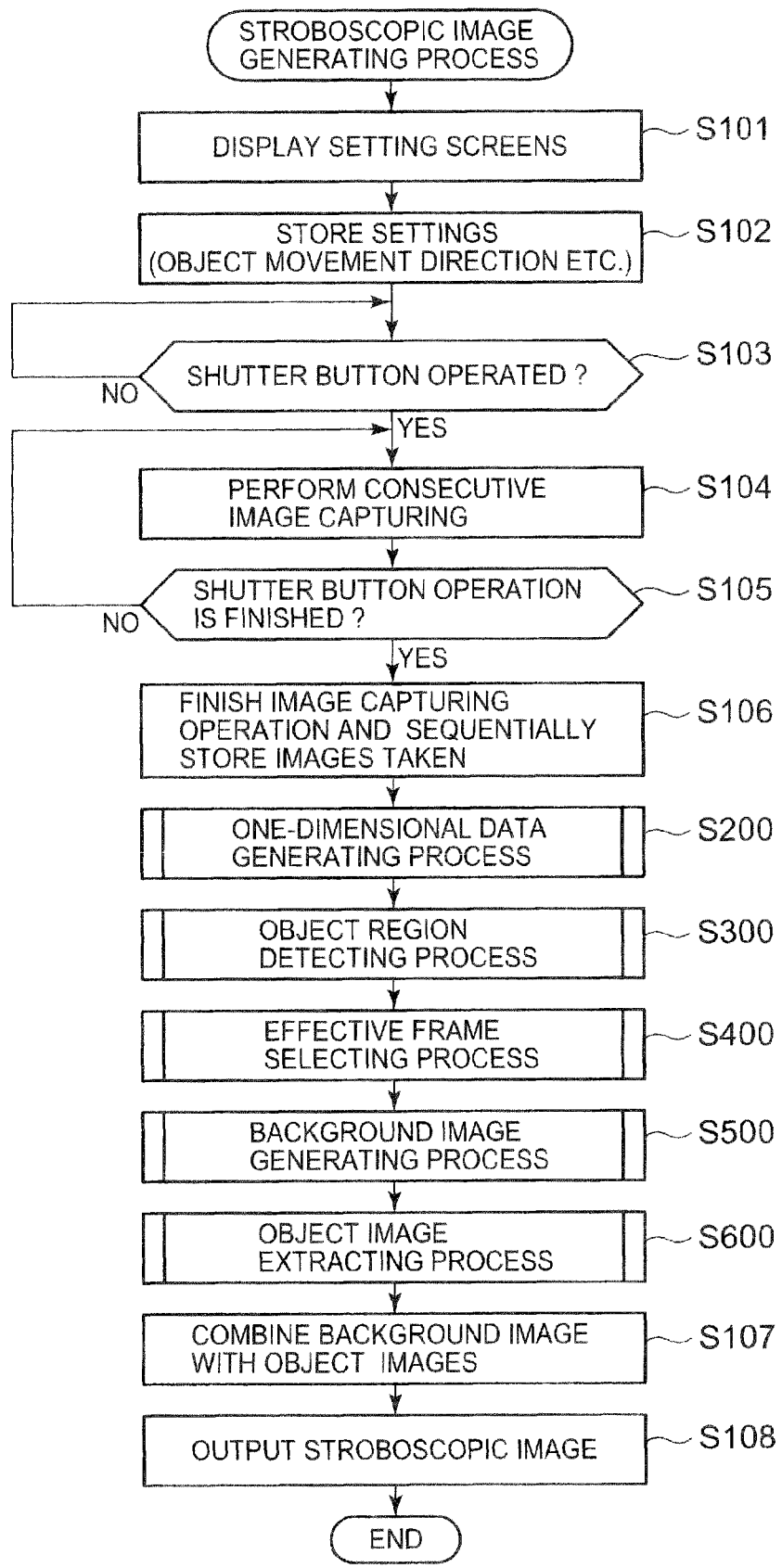
FIG. 3 is a flowchart for describing a stroboscopic image generating process according to the embodiment of the invention.

On the other hand, if the projection has been completed for all the consecutively captured images (S212: yes), the process is returned to the stroboscopic image generating process (FIG. 3).

Figure 7B:
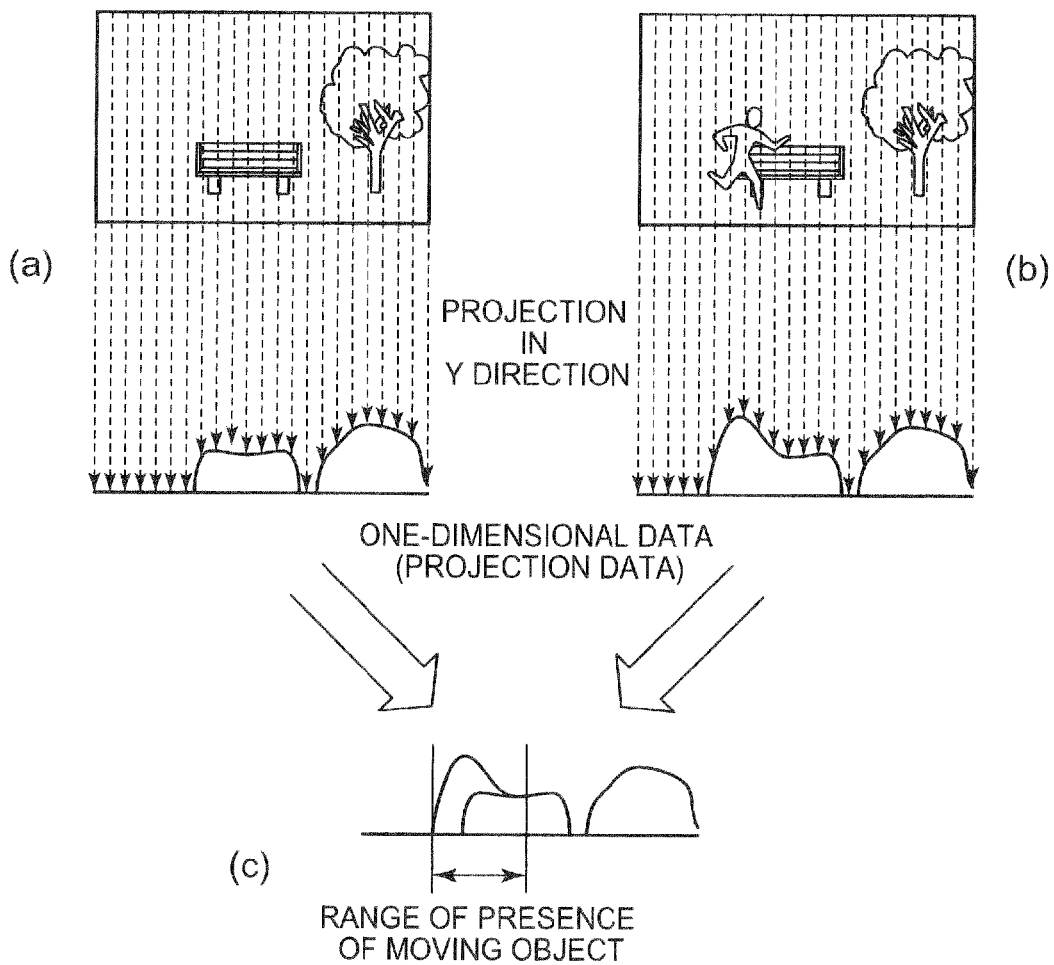

Each of the consecutively captured images is converted into one-dimensional data as shown in sections (a) and (b) in FIG. 7B, for example, by the projection of the above-described one-dimensional data generating process. For example, the one-dimensional data can be generated as a projection fn(x) of pixel values Fn(x,y) in the Y direction or as a projection fn(y) of pixel values Fn(x,y) in the X direction, which can be calculated by the following calculation (1).

$$fn(x) = \sum_{y=0}^{sizeY-1} Fn(x, y) \quad (1)$$

$$fn(y) = \sum_{x=0}^{sizeX-1} Fn(x, y)$$

where:
sizeX is the number of pixels in X direction; and
sizeY is the number of pixels in Y direction.

Upon generating the one-dimensional data (projection data) for the respective consecutively captured images, the one-dimensional data generating section 213 sequentially stores the generated one-dimensional data in the video memory 230 in such a manner that they are correlated with the frame numbers of the consecutively captured images and notifies the object detecting section 214 of the generation of one-dimensional data of all the consecutively captured images. In response to the notice from the one-dimensional data generating section 213, at step S300, the object detecting section 214 executes an object region detecting process for detecting object regions using the generated one-dimensional data.

The concept of the process of detecting an object region from one-dimensional data of a consecutively captured image will be described below with reference to sections (a), (b), and (c) shown in FIG. 7B. Section (a) in FIG. 7B shows an example of an image that is taken without the object MV in the scene shown in FIG. 5A and an example of the one-dimensional data of the image. Section (b) in FIG. 7B shows an example of an image taken with the object MV and an example of the one-dimensional data of the image.

As mentioned above, when a stroboscopic image is generated by the digital camera 1 according to the embodiment, consecutive image capturing is performed with the digital camera 1 being unmoved. Therefore, there are no large variations between background portions (i.e., portions excluding the portion where the object MV exists) in the respective consecutively captured images. As a result, a variation should be found in a range of portion where the object MV exists by comparing one-dimensional data of consecutively captured images. To facilitate understanding, sections (a) and (b) in FIG. 7B are used which show one-dimensional data of an image taken without the object MV and one-dimensional data of an image taken with the object MV. As shown in section (c)

in FIG. 7B, the two one-dimensional data differs at a range where the object MV exists whereas the two one-dimensional data are the same at a range where the object MV not exists.

That is, when the one-dimensional data of the two images are overlapped on each other as shown in section (c) in FIG. 7B, an unmatched region is found. The unmatched region where the two one-dimensional data do not match is a range where the object MV exists (the range extends in the X direction if the object movement direction is the X direction and in the Y direction if object movement direction is the Y direction). Therefore, a manner of change of the object range becomes known by calculating differences between one-dimensional data of adjacent consecutively captured images in time-series order.

The object detecting section 214 detects object regions of the consecutively captured images by performing processing that is based on the above principle. The object region detecting process (step S300) will be described below with reference to flowcharts of FIGS. 8-10.

Upon starting the process, first, at step S301, the object detecting section 214 determines whether the object movement direction is the X direction or the Y direction based on the setting that was made at step S102 of the stroboscopic image generating process (FIG. 3). The following steps will be described mainly for a case that the object movement direction is the X direction (S301: yes).

At step S302, the object detecting section 214 initializes the x coordinate as a search object. Since as described above the coordinate range of each captured image is (0, 0) to (sizeX−1, sizeY−1), the x coordinate is initialized to "0."

Then, as the object detecting section 214 sequentially selects the frames (consecutively captured images) by setting the pointer n from 1 to p, it acquires one-dimensional data (generated in the one-dimensional data generating process (FIG. 6)) corresponding to the coordinate x from the video memory 230 and stores the acquired data in, for example, the main memory of the processor 210 (steps S303-S306; S306: no).

When acquiring one-dimensional data of all the frames (S306: yes), the object detecting section 214 sorts the acquired one-dimensional data at step S307 and employs a median as a pixel value fb(x) of a case that the coordinate x belongs to a background image at step S308.

Figure 9:
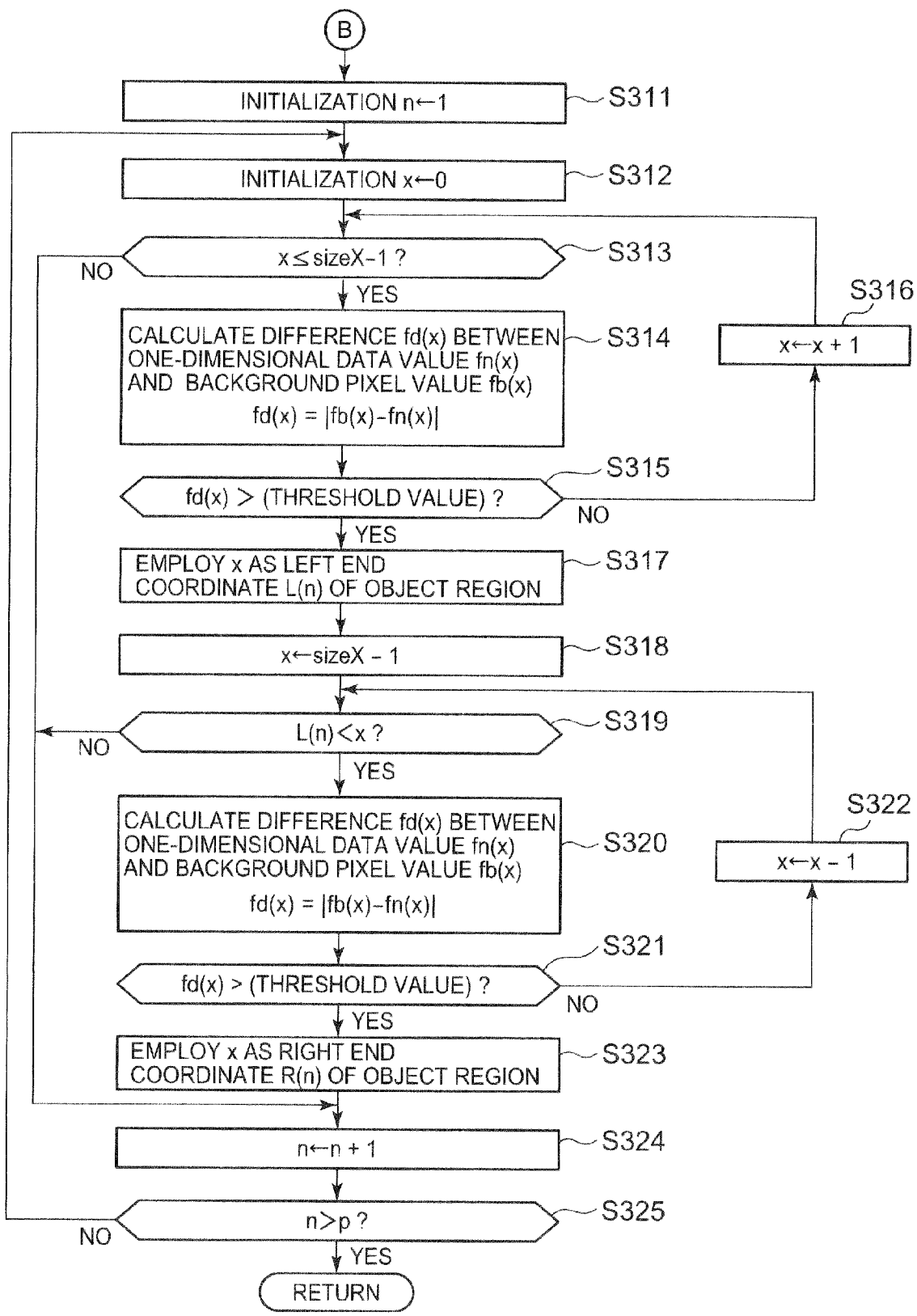
FIG. 9 is a flowchart of the object region detecting process continued from FIG. 8.

The above operation is performed for each of the x coordinates (steps S309 and S310; S310: no). When background pixel values fb(x) have been obtained for all the x coordinates (0 to sizeX−1) of all the frames (step S310: yes), the process proceeds to step S311 (FIG. 9).

The object detecting section 214 sets the pointer n to an initial value "1" at step S311 and sets the x coordinate to an initial value "0" at step S312. The object detecting section 214 calculates a difference fd(x) (=|fb(x)−fn(x)|) between the pixel value fn(x) at the x coordinate of the n-th frame and the background pixel value fb(x) at the x coordinate that was calculated at step S308 (steps S313 and S314; S313: yes).

At step S315, the object detecting section 214 determines whether the coordinate x belongs to an object region by determining whether the calculated difference fd(x) is larger than a prescribed threshold value DiffTh. That is, since the background pixel value fb(x) is a pixel value of a case that the coordinate x belongs to a background image, the coordinate x of the frame n should belong to a region other than a background region, that is, an object region, if the actual pixel value fn(x) is much different from the background pixel value fb(x). Therefore, the pixel value fn(x) can be determined as corresponding to an object region if the difference fd(x) is larger than the threshold value DiffTh that is set for the determination concerned.

If the difference fd(x) is smaller than or equal to the threshold value DiffTh (S315: no), the coordinate x of the n-th frame does not belong to an object region and hence the x coordinate is incremented by one at step S316. If the coordinate x is within the image size (S313: yes), the same determination is made for the incremented coordinate x (steps S314 and S315).

In the initialization at step S312, the x coordinate is initialized to "0" which indicates the left end of the image. Therefore, if it is determined that the search coordinate x belongs to an object region (S315: yes), at step S317 the object detecting section 214 employs the current x coordinate as a coordinate L(n) of the left end of the object region of the n-th frame.

Since the determination is made as the x coordinate is incremented by one each time starting from the left end (x=0) of the captured image, steps S312-S316 means a search of an object region starting from the left end of the image. Since the object range has a certain width in the X direction, it is also necessary to determine its right end. Therefore, upon determining the left end of the object region, the object detecting section 214 performs an operation of searching for the right end of the object region.

The object detecting section 214 searches for an object region starting from the right end of the captured image. Therefore, at step S318 the object detecting section 214 sets the search coordinate x to sizeX−1 which indicates the right end of the captured image. Since the right end of the object region is to be found, the search coordinate x should be on the right of the coordinate L(n) which was employed at step S317 as a coordinate indicating the left end of the object region. Therefore, if the search coordinate x is larger than L(n) (step S319: yes), the object detecting section 214 calculates fd(x) for the current coordinate x at step S320 and determines at step S321 whether the calculated fd(x) is larger than the threshold value DiffTh.

If fd(x) at the coordinate x is smaller than or equal to the threshold value DiffTh and hence the coordinate x does not belong to the object region (S321: no), at step S322 the object detecting section 214 decrements the search coordinate x by one and thereby shifts the search coordinate x leftward by one. Then, the object detecting section 214 makes the same determination for the decremented coordinate x (steps S319-S321). In this manner, a search is performed starting from the right end of the captured image. If it is determined that the search coordinate x belongs to the object region (S321: yes), at step S323 the object detecting section 214 employs the current coordinate x as a right end coordinate R(n) of the object region of the frame n.

If no object region is detected by a search starting from the left end of the image (S313: no) or if the x coordinate is located on the left of the left end L(n) of the object region after having been changed from the right end coordinate (S319: no), it is determined that no object region exists in the current frame n. In this case, a numerical setting L(n)=R(n), for example, is made and the search frame is changed to the next one (step S324).

Also when an object range has been detected for the frame n, the search frame is changed to the next one and the process is returned to step S312 (steps S324 and 325; S325: no). When the processing of detecting an object region has been performed for all the frames (S325: yes), the process is returned to the stroboscopic image generating process (FIG. 3).

Figure 11A:
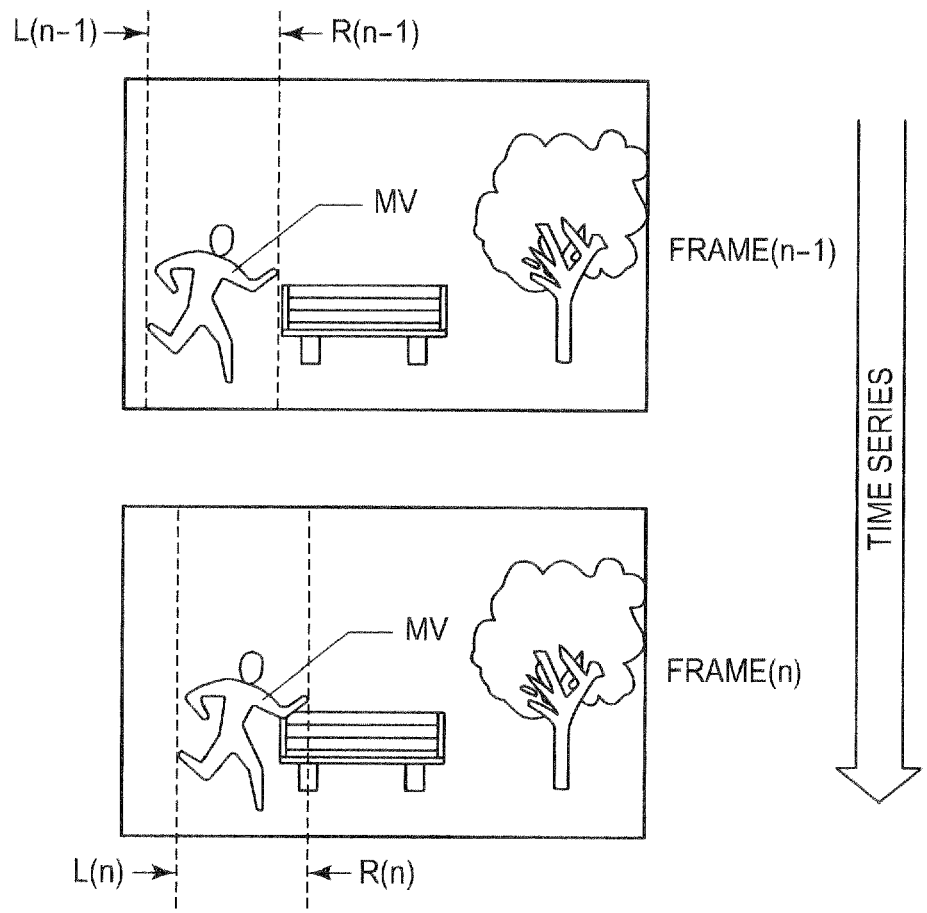

The object region detecting process of the case that the object movement direction is the X direction has been described above. In this case, as shown in FIG. 11A, ranges of the object MV in the X direction are determined sequentially in the respective frames. The thus-determined pairs of coordinates L(n) and R(n) of the object ranges are stored in the main memory, for example, so as to be correlated with the respective frame numbers.

Figure 10:
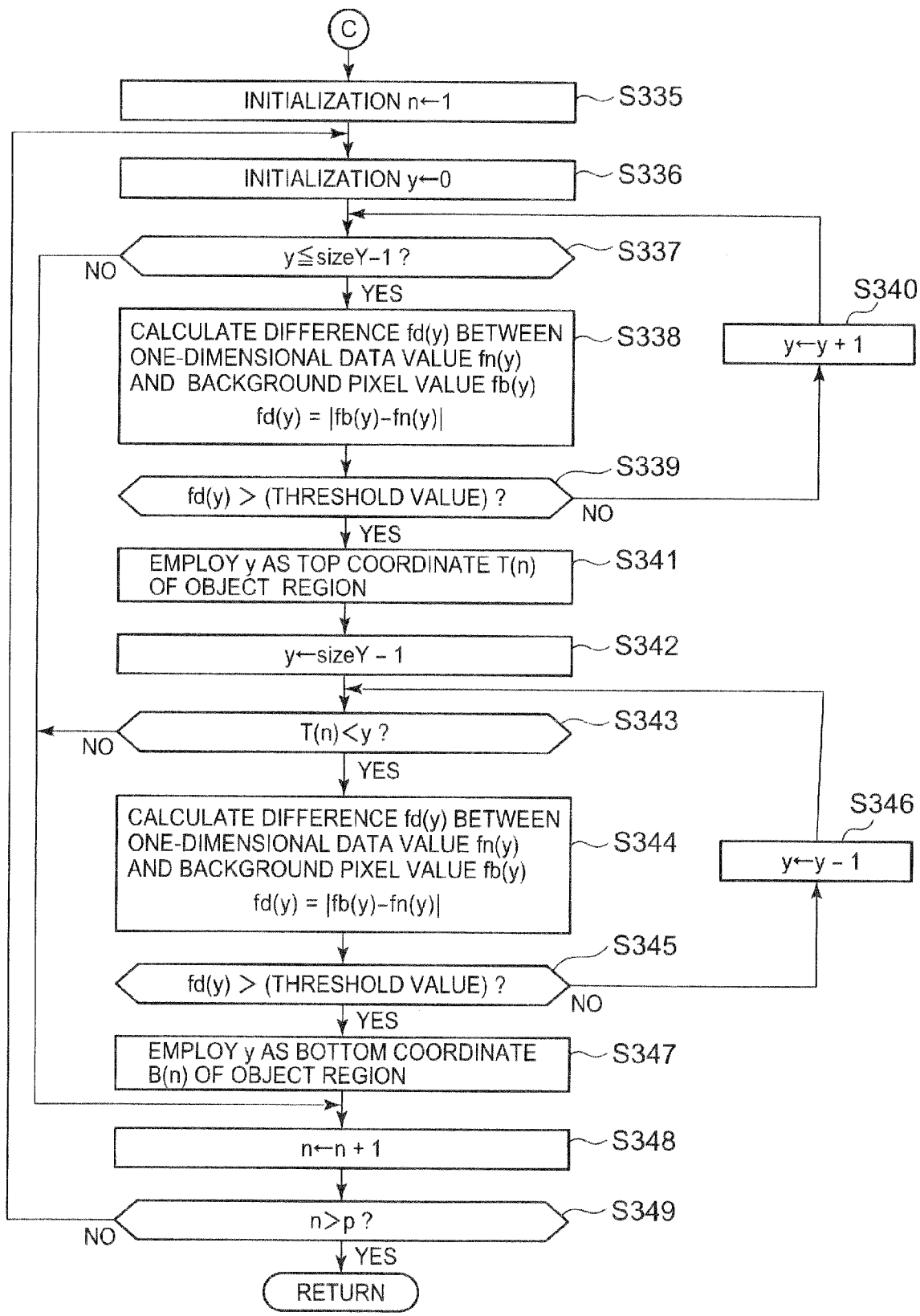
FIG. 10 is a flowchart of the object region detecting process continued from FIG. 8.
Figure 11B:
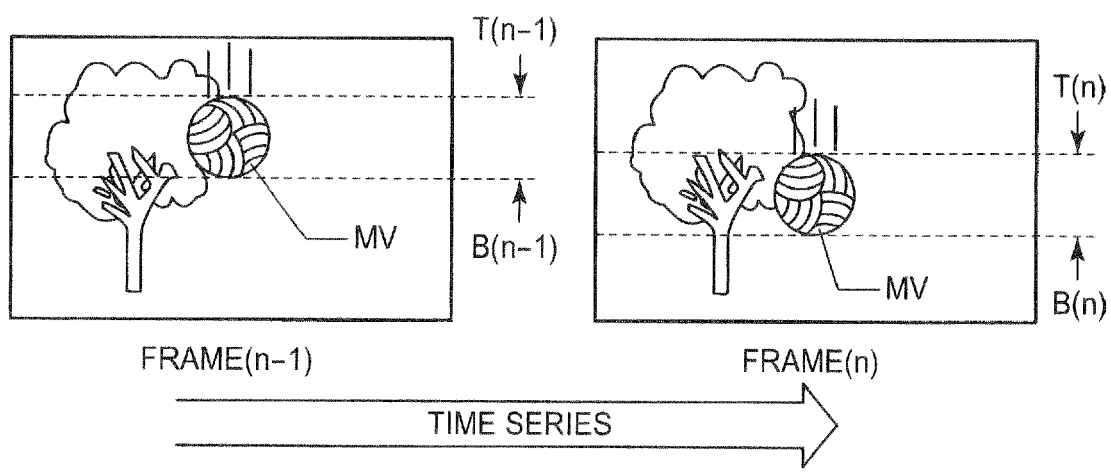

On the other hand, where the object movement direction is the Y direction, a process similar to the above process is performed in the Y direction. More specifically, steps S326-S334 of FIG. 8 and steps S335-S349 of FIG. 10 are performed, whereby top coordinates T(n) and bottom coordinates B(n) of respective object ranges in the frames are determined as shown in FIG. 11B.

Upon detecting the object regions in the above-manner, the object detection section 214 notifies the image selecting section 215 of that fact. The image selecting section 215 executes an effective frame selecting process (step S400 in FIG. 3) for selecting captured images (effective frames) to be used for generating a stroboscopic image. The effective frame selecting process will be described below with reference to flowcharts of FIGS. 12 and 13.

Figure 12:
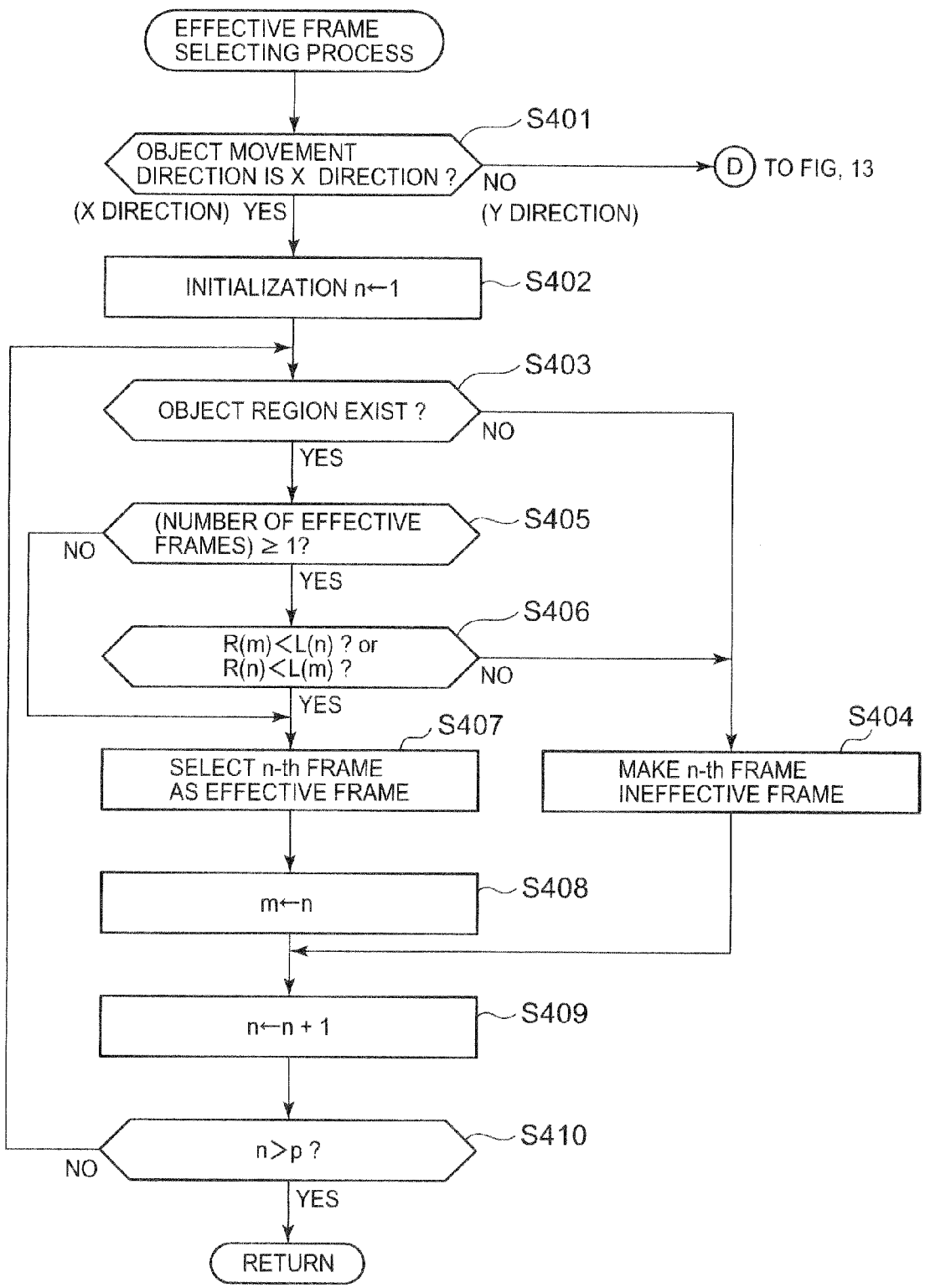
FIG. 12 is a flowchart of an effective frame selecting process which is performed in the stroboscopic image generating process shown in FIG. 3.
Figure 13:
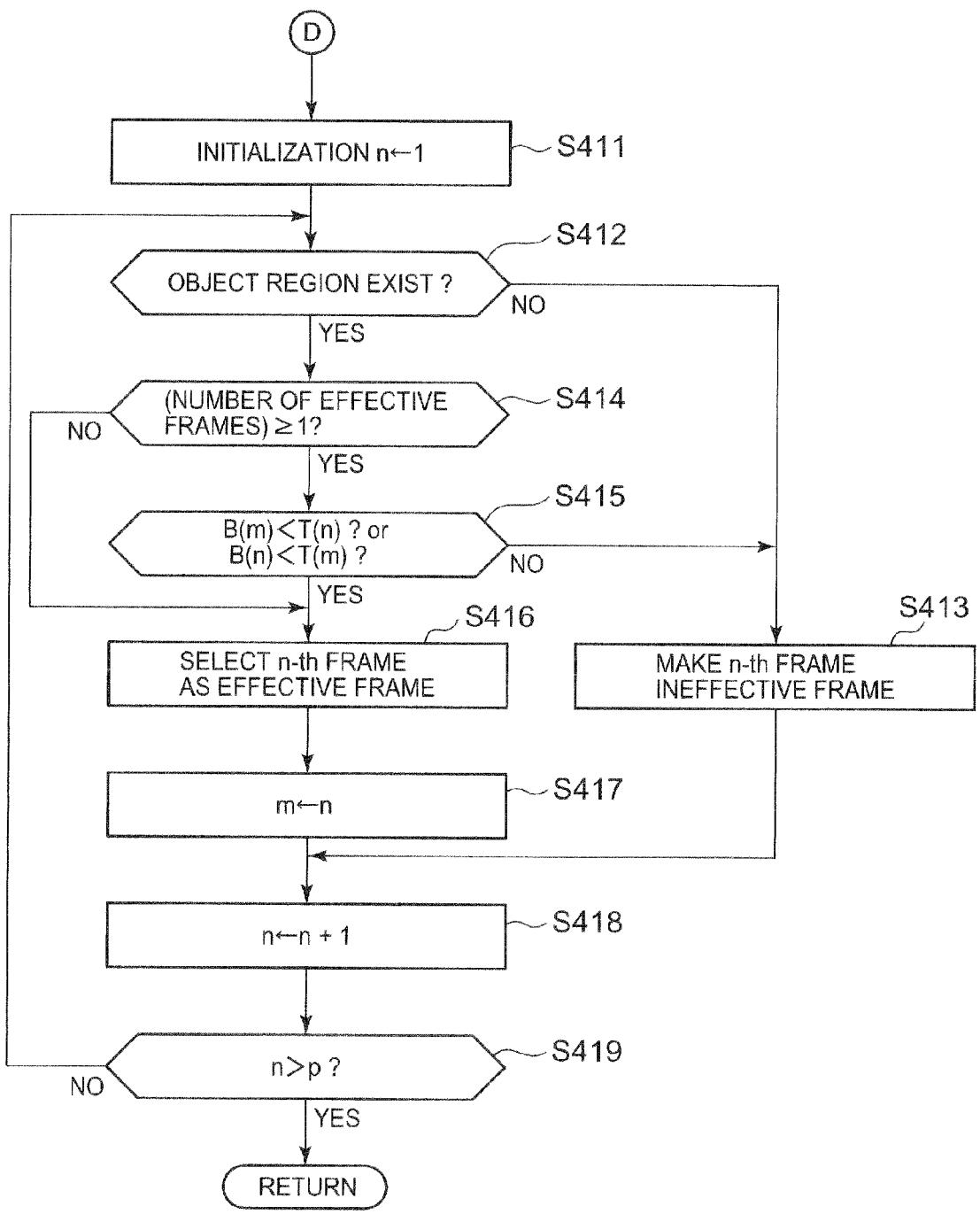
FIG. 13 is a flowchart of the effective frame selecting process continued from FIG. 12.

Upon starting the process, first, at step S401, the image selecting section 215 determines whether the object movement direction is the X direction or the Y direction. The flowchart of FIG. 12 shows a process for the case that the object movement direction is the X direction, and the flowchart of FIG. 13 shows a process for the case that the object movement direction is the Y direction.

Where the object movement direction is the X direction (S401: yes), the image selecting section 215 sets a pointer n to an initial value "1" at step S402 and determines at step S403 whether the n-th frame has an object region based on the detection result of the above-described object region detecting process. The image selecting section 215 determines that an object region was detected from the frame n if L(n) and R(n) (or T(n) and B(n)) which indicate the range of an object region is stored for the frame n and L(n) (or T(n)) is not equal to R(n) (or B(n)).

If no object region was detected from the frame n (S403: no), at step S404 the image selecting section 215 determines that the n-th frame is an ineffective frame which is not to be used for generation of a stroboscopic image. The image selecting section 215 determines presence/absence of an object region for the next frame (steps S409, S410, and S403; S410: no).

In this manner, presence/absence of an object region is determined sequentially for the consecutively captured images starting from the first frame. The image selecting section 215 selects, as an effective frame, a first frame that was determined as having an object region (steps S403, S405, and S407; S405: no). The image selecting section 215 assigns an effective frame number which is different from the frame number to a frame (consecutively captured image) that has been selected as an effective frame. A frame that is selected as an effective frame for the first time at step S407 is assigned an effective frame number "1." At step S408, the image selecting section 215 sets, in a pointer m which indicates an effective frame, the frame number of the frame that was selected as an effective frame at step S407.

Upon selecting a first effective frame and setting its frame number in the pointer m, the image selecting section 215 increments the pointer n by one at step S409 and determines presence/absence of an object region for the incremented frame at step S403 (S410: no). That is, the image selecting section 215 searches for a next frame to be used for generation of a stroboscopic image. After a first effective frame has been selected (S405: yes), the image selecting section 215 selects, as an effective frame, a frame whose object portion does not overlap with the object portion of the preceding effective frame by comparing the object range of the search object frame (n-th frame) with that of the effective frame that was selected immediately before (i.e., the frame indicated by the pointer m).

Where the object movement direction is the X direction, there are two kinds of movement, that is, a left-to-right movement and a right-to-left movement. If the object MV moved from left to right, the object region of the frame n should be located on the right of that of the frame m. On the other hand, if the object MV moved from right to left, the object region of the frame n should be located on the left of that of the frame m.

Therefore, at step S406, the image selecting section 215 determines that the object portion of the frame n does not overlap with that of the frame m if L(n) indicating the left end of the object region of the frame n is larger than R(m) indicating the right end of the object region of the frame m or R(n) indicating the right end of the object region of the frame n is smaller than L(m) indicating the left end of the object region of the frame m.

If the object region of the frame n satisfies the above condition (S406: yes), at step S407 the image selecting section 215 selects the current frame (n-th frame) as an effective frame. On the other hand, if the condition is not satisfied (S406: no), at step S404 the image selecting section 215 makes the n-th frame an ineffective frame that is not to be used for generation of a stroboscopic image.

Effective frames are selected by the above condition determination for the remaining consecutively captured images. When effective frames have been selected by checking all the consecutively captured images (step S410: yes), the effective frames which are assigned effective frame numbers that are different from the frame numbers are discriminated from ineffective frames that will not be used for generation of a stroboscopic image (see FIG. 14).

Figure 14:
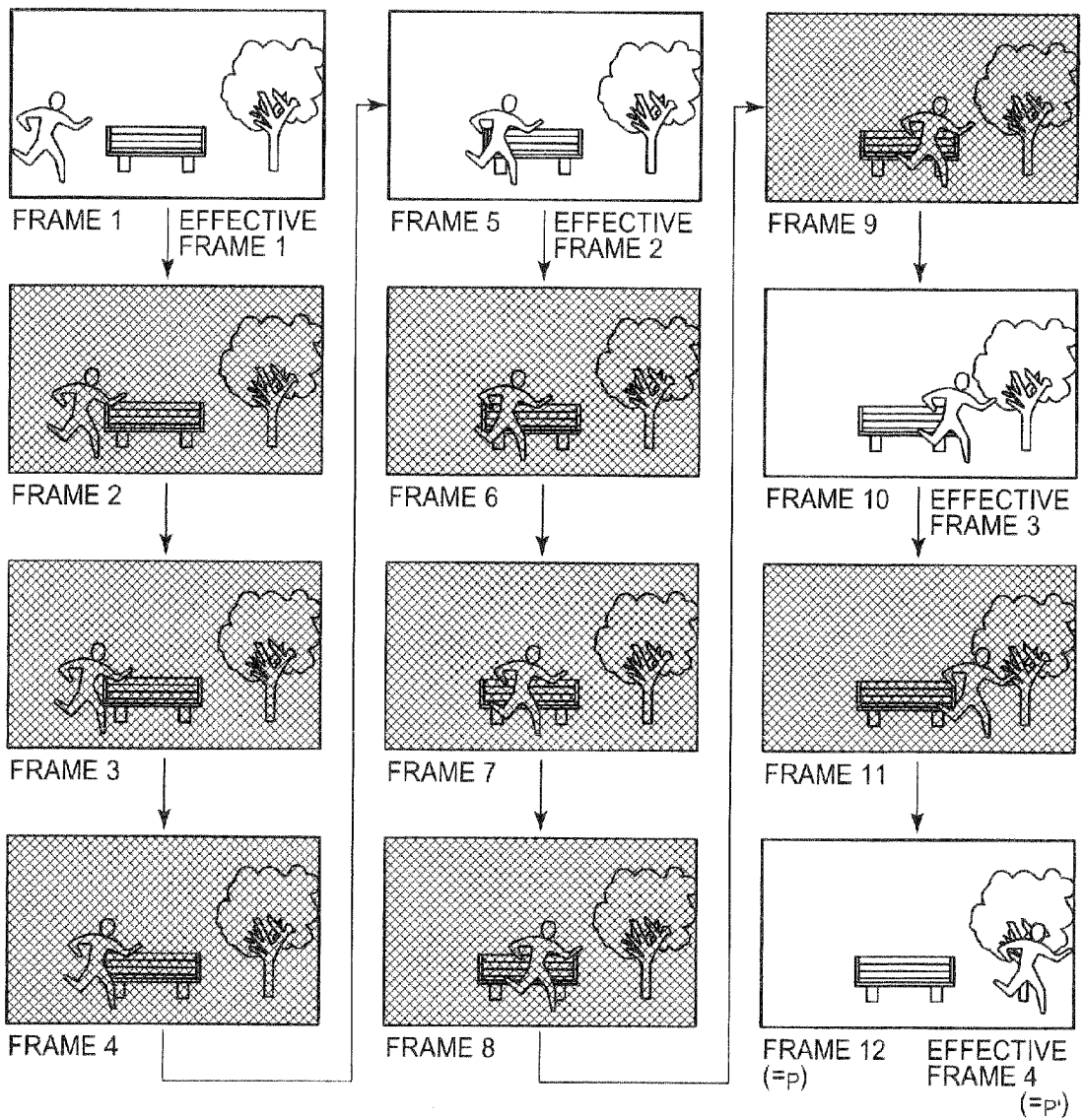
FIG. 14 shows example of a selection of effective frames.

It is assumed that, as shown in FIG. 14, the effective frame numbers are assigned to the selected effective frames consecutively in time-series order. The number of selected effective frames is represented by p' (p'≦p). Assigning pieces of identification information to effective frames in this manner makes it possible to select the effective frames from the consecutively captured images stored in the video memory 230. Alternatively, the ineffective frames may be deleted from the video memory 230 to leave only the effective frames therein.

The operation of selecting effective frames in the case where the object moved in the X direction has been described above. Where the object movement direction is the Y direction (S401 in FIG. 12: no), effective frames can be selected by a similar process. More specifically, steps S411-S419 of the flowchart of FIG. 13 are performed, whereby frames in which image portions of an object MV that moved in the Y direction do not overlap with each other are selected as effective frames. A selection condition that is used after selection of a first effective frame should be such that both of a case that the object MV moved downward and a case that the object MV moved upward are taken into consideration.

That is, if the object MV moved downward, the object region of the frame n should be located under that of an effective frame m that was selected immediately before. On the other hand, if the object MV moved upward, the object region of the frame n should be located over that of an effective frame m that was selected immediately before.

Therefore, at step S415 in FIG. 13, the image selecting section 215 determines that the object portion of the frame n does not overlap with that of an effective frame m that was selected immediately before if T(n) indicating the top of the object region of the frame n is larger than B(m) indicating the bottom of the object region of the frame m or B(n) indicating the bottom of the object region of the frame n is smaller than T(m) indicating the top of the object region of the frame m.

As described above, object regions are detected from one-dimensional data obtained by projecting captured images in one direction and frames whose object portions do not overlap with each other are selected. That is, images (effective frames) to be used for generation of a stroboscopic image are selected based on one-dimensional data that are small in data amount, whereby the amount of processing to be performed until selection of images can be made much smaller than in the case of using all data of captured images.

In the stroboscopic image generating process (FIG. 3), images (effective frames) to be used for generation of a stroboscopic image have been selected, a background image generating process (step S500) for generating a background image of a stroboscopic image and an object image extracting process (step S600) for extracting images of object portions from the effective frames are performed in this order.

Figure 15:
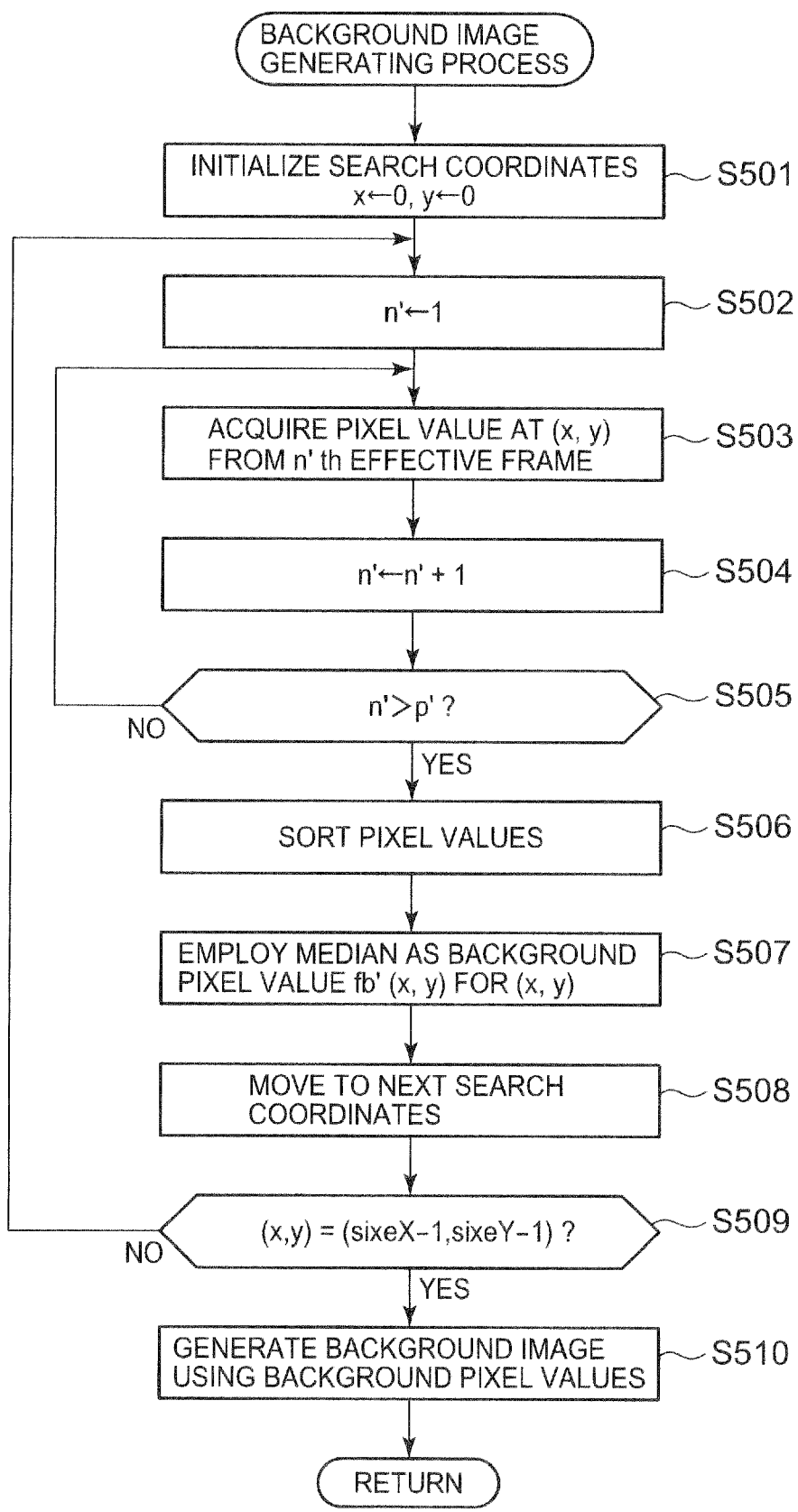
FIG. 15 is a flowchart of a background image generating process which is performed in the stroboscopic image generating process shown in FIG. 3.

The background image generating process will be described below with reference to a flowchart of FIG. 15. The background image generating process is started in response to the notification by the image selecting section 215, which notifies the background image generating section 216 of completion of the effective frame selecting process.

Upon starting the process, at step S501, the background image generating section 216 initializes search coordinates (x, y) of an effective frame. In the embodiment, each of x and y is set to an initial value "0," whereby the search coordinates are set to the coordinate origin (0, 0) of the effective frame.

Then, the background image generating section 216 sequentially acquires pixel values at the thus-set coordinates (x, y) from all the effective frames 1 to p' stored in the video memory 230 by sequentially setting a pointer n' (which indicates an effective frame) from 1 to p' (steps S502-S505); S505: no).

When pixel values at the coordinates (x, y) have been acquired from all the effective frames (S505: yes), the background image generating section 2-16 sorts the acquired pixel values at step S506 and employs, at step S507, a median as a pixel value (background pixel value fb'(x, y)) of a case that the coordinates (x, y) belong to a background portion.

After determining the background pixel value fb'(x, y) for the coordinates (x, y), the background image generating section 216 sequentially determines background pixel values fb'(x, y) as it sets the search coordinates (x, y) to the respective sets of coordinates within the image range of the effective frame (steps S508-S509 and S502-S207; S509: no). For example, the x coordinate is incremented by one sequentially for the same y coordinate, and the y coordinate is incremented by one and the x coordinate is returned to 0 when the x coordinate reaches the right end of the image. As this operation is performed repeatedly, pixel values at (0, 0) to (sizeX−1, sizeY−1) are acquired sequentially and background image values fb'(x, y) for the respective sets of coordinates are determined.

The background image values fb'(x, y) acquired for all the sets of coordinates are employed as pixel values at the respective sets of coordinates, whereby a background image representing only background portions of the effective frames is obtained. Upon generating the background image in this manner at step S510, the background image generating section 216 stores the generated background image in the video memory 230 and notifies the object extracting section 214 of the generation of a background image. Then, the process is finished.

Figure 16:
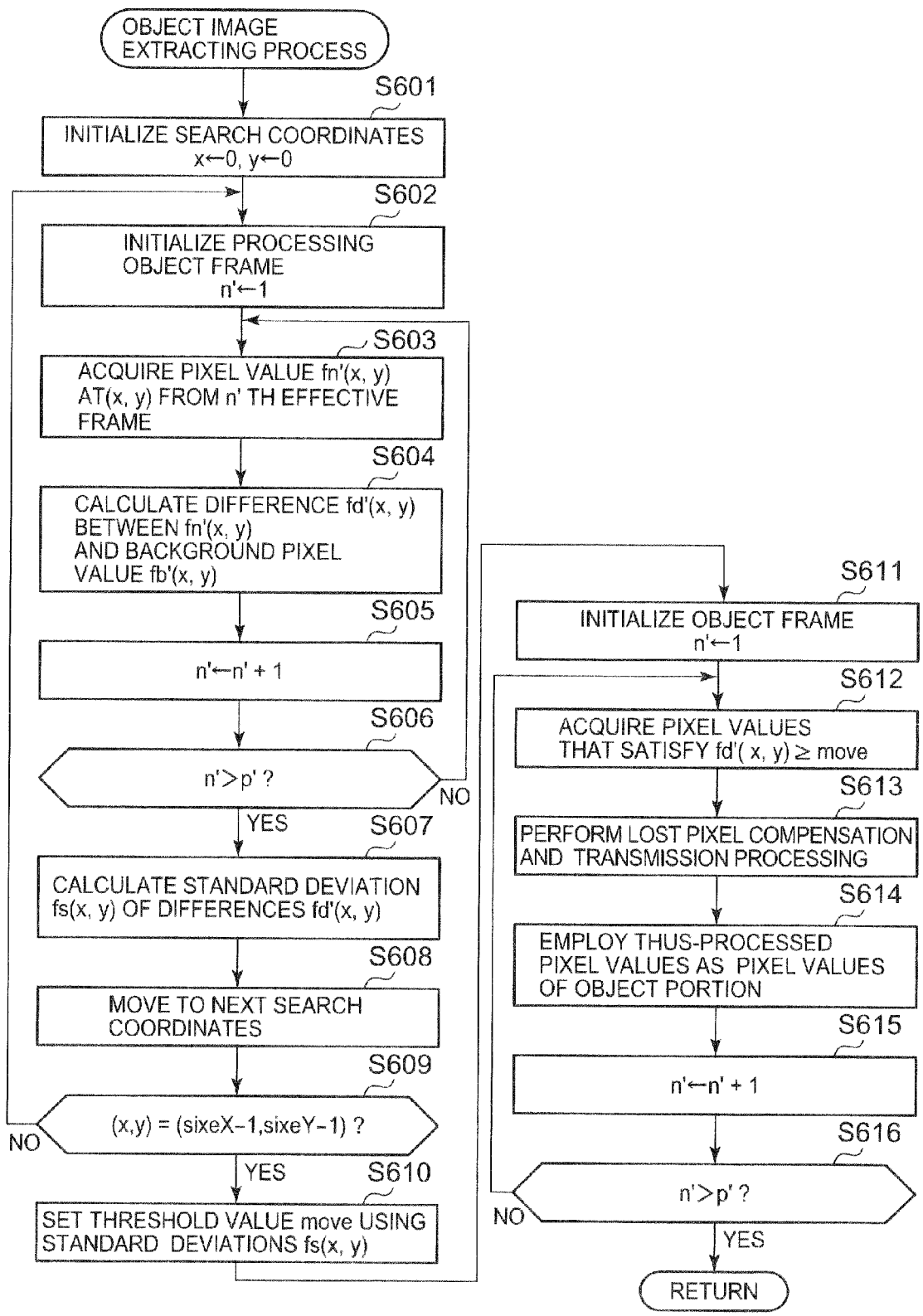
FIG. 16 is a flowchart of an object image extracting process which is performed in the stroboscopic image generating process shown in FIG. 3.

The process is returned to the stroboscopic image generating process (FIG. 3), whereupon the object image extracting process (step S600) is performed. The object image extracting process is started by the object detecting section 214 in response to the generation of the background image. The object image extracting process will be described below with reference to a flowchart of FIG. 16.

Upon starting the process, the object detecting section 214 initializes the coordinates (x, y) at step S601 and initializes the processing object frame at step S602. Then, the object detecting section 214 sequentially acquires pixel values fn'(x, y) at the coordinates (x, y) from the effective frames 1 to p', and calculates differences fd'(x, y) between the pixel values fn'(x, y) and the background pixel values fb'(x, y) for the coordinates (x, y) (steps S603-S606; S606: no).

Upon calculating differences fd'(x, y) for the coordinates (x, y) for all the effective frames (S606: yes), at step S607 the object detecting section 214 calculates a standard deviation fs(x, y) of the calculated differences fd'(x, y). For example, the object detecting section 214 calculates a standard deviation fs(x, y) by the following calculation (2).

$$fs(x, y) = \sqrt{\frac{\sum_{n'=1}^{p'} (fd'(n', x, y)^2)}{p' - 1}} \quad (2)$$

where fd'(n', x, y) is a difference fd'(x, y) at a coordinate (x, y) in the frame n'

After calculating the standard deviation fs(x, y) for the coordinates (x, y) the object detecting section 214 sequentially calculates standard deviations fs(x, y) for the remaining sets of coordinates (x, y) as it moves the search coordinates (x, y) within the image range of the effective frames (steps S608-S609 and steps S602-S607; S609: no).

Upon calculating the standard deviators fs(x, y) for the respective sets of coordinates (x, y), at step S610 the object detecting section 214 sets, based on the calculated standard deviations fs(x, y), variation threshold value "move" to be used for determining object portions of the respective effective frames. For example, the object detecting section 214 sets the threshold value "move" according to the following calculation (3).

$$over[m] = fd'(n', x, y) \begin{cases} fs(x, y) < fd'(n', x, y) \\ 1 \leq m \leq \text{max} n \end{cases} \quad (3)$$

$$move = \sqrt{\frac{\sum_{m=1}^{\text{max} m} (over[m]^2)}{\text{max} n - 1}}$$

where maxm is the number of pixels that satisfies inequality fs(x, y)<fd'(n', x, y)

Upon setting the variation threshold values "move," the object detecting section 214 acquires pixel values that satisfy (difference fd'(x, y))≧(variation threshold value "move") from each of the effective frames 1 to p' stored in the video memory 23C (steps S611, S612, S615, and S616, s616: no).

At step S614, the object detecting section 214 employs the pixel values that satisfy the above condition as pixel values of an object portion of the frame n'. In this operation, for example, the object detecting section 214 generates data in which coordinates where (difference fd'(x, y))≧(variation threshold value "move") is satisfied are given a value "1" and coordinates where (difference fd'(x, y))<(variation threshold value "move") is satisfied are given a value "0." With respect to the thus generated data having values of zeros and ones, each portions having the pixels given with the value of "1" and being adjacent to one another are labeled with unique numbers. Thereafter, the pixel values of the pixels belonging to the labeled portion having the largest size are set as the pixel values of the object portion in the frame n'.

At step S613, the object detecting section 214 performs, for example, processing of compensating for lost pixels such as expansion, hole filling, and contraction and processing of adding a transparency parameter to a peripheral portion of the object portion.

Images of object portions (object images) are extracted from the respective effective frames as a result of the execution of the above process. This process is finished as soon as the object images have been extracted from all the effective frames, and the process is returned to the stroboscopic image generating process of FIG. 3. At this time, the object detecting section 214 notifies the stroboscopic image generating section 217 of the extraction of object images.

Figure 17:
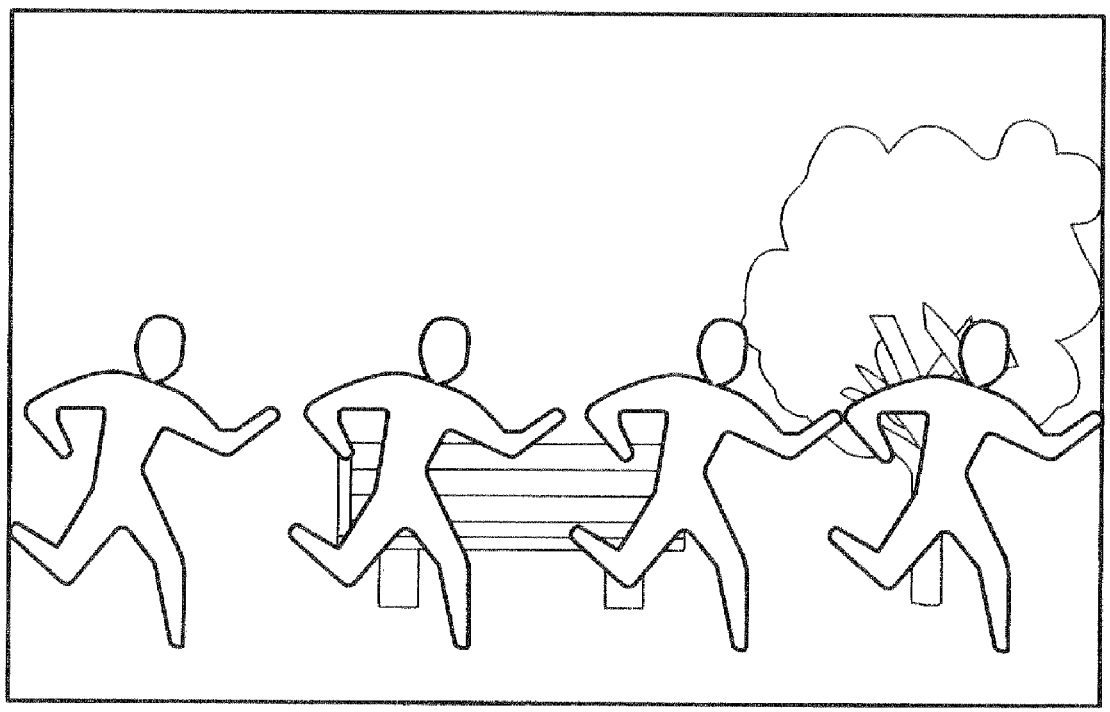
FIG. 17 shows an example of a stroboscopic image generated by the stroboscopic image generating process.

At step S107, the stroboscopic image generating section 217 generates a stroboscopic image as shown in FIG. 17 by combining the background image that was generated by the background image generating process (step S500) with the object images of the respective effective frames that were extracted by the object image extracting process (step S600).

The generated stroboscopic image is displayed on the display unit 310 through the image output unit 240 and stored in the storage unit 250 or the external storage unit 260 in response to input of an instruction through the user interface 330 by the user of the digital camera 1.

Where the camera orientation is "vertical," a stroboscopic image can be generated in the same manner as described above by executing the above process with a coordinate system that is obtained by rotating the above-used coordinate system by −90 degrees or 90 degrees.

The above-described embodiment of the invention can thus generate a stroboscopic image at high speed.

More specifically, since images produced by consecutive image capturing are converted into one-dimensional data which are small in data amount and frames necessary for generation of a stroboscopic image are selected based on the one-dimensional data, the amount of processing that needs to be performed until selection of images is reduced to a large extent and hence the processing time can be shortened.

The one-dimensional data may be projection data that are obtained by projecting captured images in one direction. This makes it possible to generate one-dimensional data by simple processing.

One-dimensional data can be generated along an object movement direction by generating projection data by projecting captured images in one direction that is orthogonal to the object movement direction. Such projection data make it easy to determine whether object portions overlap with each other in the object movement direction. As a result, a stroboscopic image with no overlap between object portions can be automatically generated merely by determining an object movement direction in accordance with a simple input made by the user.

Since the amount of processing that is used for the generation of one-dimensional data and the selection of effective frames is small, a stroboscopic image can be generated at high speed without the need for giving an unnecessarily high processing ability to the processor or the like of a digital camera. As a result, even a compact digital camera or the like can generate a stroboscopic image at the site of shooting without stressing the user.

Accordingly, it possible to perform throughout the process from capturing images to generating the stroboscopic image in a short time at the place where the images are taken using only a digital camera without the need for preparing a large-scale apparatus such as a personal computer in the case of, for example checking the form of a sport action using a stroboscopic image.

Since processing to selection of effective frames can be performed at high speed, a stroboscopic image can be generated at high speed even if the number of consecutively captured images is large. Since no limitations are imposed on the number of captured images, the consecutive image capturing speed, etc., a stroboscopic image can be generated even if the images are taken without any special care about the consecutive image capturing speed or the start timing for starting to take the images.

The above embodiment is described merely as an example, and the application range of the invention is not limited to the embodiment described above. Various applications and modifications are possible without departing from the spirit and scope of the invention.

For example, although in the embodiment the search of an object region and the acquisition of background pixel values are performed on a pixel-by-pixel basis, they can be performed faster by, for example, skipping coordinates.

Although in the embodiment a median of the pixel values of effective frames is employed as a background pixel value, an average, for example, may be employed as a background pixel value.

The processing speed may be increased by performing the necessary processing after making the number of pixels of a processing object image smaller than that of an actual image size.

In the embodiment, a background image is generated by using medians of pixel values, at respective sets of coordinates, of effective frames. Alternatively, if an image from which no object region is detected exists in consecutively captured images, it may be used as a background image without executing the above-described background image generating process.

In the embodiment, a stroboscopic image in which object images do not overlap with each other is generated by selecting, as effective frames, frames in which object portions do not overlap with each other. However, the invention is not limited to such a case. For example, a stroboscopic image may be generated in which object portions are arranged so as to be spaced from each other by an arbitrarily specified interval. In this case, for example, the user specifies a desired interval (e.g., the number of pixels) between object images through a setting screen before shooting. A stroboscopic image having object portions that are spaced from each other by the specified interval can be generated by sequentially selecting effective frames in such a manner that a frame whose L(n) (or (R(n)) or T(n) (or B(n)) is spaced by the specified interval from L(n) (or (Rn)) or T(n) (or B(n)) of an object region (detected from one-dimensional data) of an immediately preceding effective frame is selected as the next effective frame. In this case, whereas object portions of a stroboscopic image do not overlap with each other if the specified interval is large, they overlap with each other if the specified interval is small. Also in this case, a stroboscopic image can be generated at high speed because object regions are detected from one-dimensional data.

Where the invention is implemented as an imaging apparatus such as the digital camera 1 according to the embodiment, the imaging apparatus is provided in advance with the configuration and the functions according to the embodiment. It is also possible to allow an existing imaging apparatus to function as an imaging apparatus according to the invention by applying to it programs for realizing the same functions as the functions of the processor 210.

Although the embodiment is directed to the digital still camera as an example imaging apparatus, the form of the imaging apparatus is arbitrary. Not only can the invention be implemented as an independent digital still camera, but also the invention can be applied to various electronic apparatus (e.g., a cell phone) having an imaging function similar to the imaging function of a digital still camera.

In the embodiment, a stroboscopic image is generated from images produced by the consecutive image capturing function of the digital still camera. However, a stroboscopic image can be generated from video image data because the video image data also provides frame images in which the object position varies consecutively. Therefore, a stroboscopic image can be generated at high speed by applying the invention to a video camera or other various imaging apparatus having a video image capturing function.

Also in this case, an existing apparatus is allowed to function as an imaging apparatus according to the invention by applying proper software programs to it.

The method for applying such programs is arbitrary. For example, programs can be applied being stored in a storage medium such as a CD-ROM or a memory card or applied through a communication medium such as the Internet.

A stroboscopic image can be generated at high speed by applying proper programs to an apparatus capable of image processing. That is, the application range of the invention is not limited to imaging apparatus. A stroboscopic image can be generated at high speed from images taken in advance by applying proper programs to a personal computer or the like.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An imaging apparatus comprising:
    an imaging section that generates a plurality of consecutive shooting images by shooting;
    a specification section for specifying a movement direction of a subject;
    a one-dimensional data generating section that generates one-dimensional data according to the movement direction of the subject specified by the specification section for each of the shooting images generated by the imaging section;
    a subject detecting section that detects subject regions of the respective shooting images by calculating a difference value between a median value of corresponding coordinates in a plurality of the one-dimensional data generated by the one-dimensional data generating section and each of coordinate values of the corresponding coordinates in each of the plurality of the one-dimensional data, and by comparing the difference value with a threshold value;
    an image selecting section that selects the shooting images that include the subject regions detected by the subject detecting section, such that the subject regions of the selected shooting images do not overlap with one another, as shooting images to be used for generation of a stroboscopic image;
    a background image generating section that generates a background image from the shooting images selected by the image selecting section; and
    a stroboscopic image generating section that generates a stroboscopic image by combining the background image generated by the background image generating section with the subject regions of the shooting images selected by the image selecting section.

2. A stroboscopic image generating method for generating a stroboscopic image from shooting images taken by an imaging apparatus, wherein the method comprises performing, with the imaging apparatus:
    generating a plurality of consecutive shooting images by shooting;
    specifying a movement direction of a subject;
    generating one-dimensional data according to the specified movement direction of the subject for each of the shooting images;
    detecting subject regions of the respective shooting images by calculating a difference value between a median value of corresponding coordinates in a plurality of the generated one-dimensional data and each of coordinate values of the corresponding coordinates in each of the plurality of the one-dimensional data, and by comparing the difference value with a threshold value;
    selecting the shooting images that include the detected subject regions, such that the subject regions of the selected shooting images do not overlap with one another, as shooting images to be used for generation of a stroboscopic image;
    generating a background image from the selected shooting images; and
    generating a stroboscopic image by combining the generated background image with the subject regions of the selected shooting images.

3. A non-transitory computer readable storage medium having a program stored thereon that is executable by a computer to cause the computer to control an imaging apparatus to perform functions comprising:
    generating a plurality of consecutive shooting images by shooting;
    specifying a movement direction of a subject;
    generating one-dimensional data according to the specified movement direction of the subject for each of the shooting images;
    detecting subject regions of the respective shooting images by calculating a difference value between a median value of corresponding coordinates in a plurality of the generated one-dimensional data and each of coordinate values of the corresponding coordinates in each of the plurality of the one-dimensional data, and by comparing the difference value with a threshold value;
    selecting the shooting images that include the detected subject regions, such that the subject regions of the selected shooting images do not overlap with one another, as shooting images to be used for generation of a stroboscopic image;
    generating a background image from the selected shooting images; and generating a stroboscopic image by combining the generated background image with the subject regions of the selected shooting images.

4. The imaging apparatus according to claim 1, wherein the one-dimensional data generating section generates, as the one-dimensional data, projection data by projecting the respective shooting images in a direction that is perpendicular to the movement direction of the subject.

5. The imaging apparatus according to claim 1, further comprising:
   a shutter button configured to be operable by a user;
   wherein the imaging section starts generating the consecutive shooting images in accordance with a single operation of the shutter button by the user.

6. The method according to claim 2, wherein generating the one-dimensional data comprises generating projection data as the one-dimensional data, by projecting the respective shooting images in a direction that is perpendicular to the movement direction of the subject.

7. The method according to claim 2, wherein the imaging apparatus comprises a shutter button configured to be operable by a user; and
   wherein the generating of the consecutive shooting images is started in accordance with a single operation of the shutter button by the user.

8. The non-transitory computer readable storage medium according to claim 3, wherein generating the one-dimensional data comprises generating projection data as the one-dimensional data, by projecting the respective shooting images in a direction that is perpendicular to the movement direction of the subject.

9. The non-transitory computer readable storage medium according to claim 3, wherein the imaging apparatus comprises a shutter button configured to be operable by a user; and
   wherein the generating of the consecutive shooting images is started in accordance with a single operation of the shutter button by the user.

* * * * *